US008940436B2

(12) United States Patent
Miyuki et al.

(10) Patent No.: US 8,940,436 B2
(45) Date of Patent: Jan. 27, 2015

(54) SULFUR-MODIFIED POLYACRYLONITRILE, MANUFACTURING METHOD THEREFOR, AND APPLICATION THEREOF

(75) Inventors: Takuhiro Miyuki, Ikeda (JP); Tetsuo Sakai, Ikeda (JP); Junichi Niwa, Kariya (JP); Hitotoshi Murase, Kariya (JP)

(73) Assignees: National Institute of Advanced Industrial Science and Technology, Tokyo (JP); Kabushiki Kaisha Toyota Jidoshokki, Aichi (JP)

( * ) Notice: Subject to any disclaimer, the term of this patent is extended or adjusted under 35 U.S.C. 154(b) by 820 days.

(21) Appl. No.: 13/123,933

(22) PCT Filed: Oct. 15, 2009

(86) PCT No.: PCT/JP2009/067829
§ 371 (c)(1),
(2), (4) Date: Apr. 13, 2011

(87) PCT Pub. No.: WO2010/044437
PCT Pub. Date: Apr. 22, 2010

(65) Prior Publication Data
US 2011/0200875 A1    Aug. 18, 2011

(30) Foreign Application Priority Data
Oct. 17, 2008   (JP) .................... 2008-268330

(51) Int. Cl.
*H01M 4/60*   (2006.01)
*C08F 20/44*   (2006.01)
(Continued)

(52) U.S. Cl.
CPC .............. *C08F 20/44* (2013.01); *C01B 31/04* (2013.01); *H01M 4/0404* (2013.01);
(Continued)

(58) Field of Classification Search
CPC ............................... H01M 4/60; H01M 4/608
USPC ..................................... 429/213, 215
See application file for complete search history.

(56) References Cited

U.S. PATENT DOCUMENTS

| 6,294,615 | B1 | 9/2001 | Higashino et al. |
| 2001/0033971 | A1 | 10/2001 | Zhao et al. |

(Continued)

FOREIGN PATENT DOCUMENTS

| CN | 1354529 A | 6/2002 |
| EP | 0 965 652 A1 | 12/1999 |

(Continued)

OTHER PUBLICATIONS

Wang et al. Room temperature Na/S batteries with sulfur composite cathode materials. Electrochemistry Communications 9 (2007) 31-34.*

(Continued)

*Primary Examiner* — Tracy Dove
(74) *Attorney, Agent, or Firm* — Sughrue Mion, PLLC

(57) ABSTRACT

Provided is a sulfur-modified polyacrylonitrile manufacturing method that is characterized in that a starting base powder that comprises sulfur powder and polyacrylonitrile powder is mixed and the mixture is heated in a non-oxidizing environment while outflow of sulfur vapor is prevented. Also provided are a cathode for lithium batteries that uses, as the active substance, the sulfur-modified polyacrylonitrile manufactured with the method, and a lithium secondary battery that includes the cathode as a component element. This enables the practical use of an inexpensive sulfur-based material as the cathode material for lithium secondary batteries, and in particular, a sulfur-based cathode material that enables higher output and has excellent cycle life characteristics, as well as other characteristics, and secondary lithium batteries using the same can be obtained.

9 Claims, 15 Drawing Sheets

(51) Int. Cl.
  *C01B 31/04*    (2006.01)
  *H01M 4/04*    (2006.01)
  *H01M 4/1399*   (2010.01)
  *H01M 4/66*    (2006.01)
  *H01M 6/50*    (2006.01)
  *H01M 10/052*   (2010.01)

(52) U.S. Cl.
  CPC ............ *H01M 4/1399* (2013.01); *H01M 4/60* (2013.01); *H01M 4/604* (2013.01); *H01M 4/663* (2013.01); *H01M 6/5088* (2013.01); *H01M 10/052* (2013.01); *H01M 4/661* (2013.01); *Y02E 60/122* (2013.01); *Y02T 10/7011* (2013.01)
  USPC .......................................... 429/213; 429/215

(56) References Cited

U.S. PATENT DOCUMENTS

| | | |
|---|---|---|
| 2002/0106561 A1 | 8/2002 | Lee et al. |
| 2009/0239147 A1* | 9/2009 | Itou et al. ................. 429/217 |

FOREIGN PATENT DOCUMENTS

| | | | |
|---|---|---|---|
| EP | 1 427 039 A2 | | 6/2004 |
| JP | 06-029020 A | | 2/1994 |
| JP | 07-085863 A | | 3/1995 |
| JP | 2000-191733 A | | 7/2000 |
| JP | 2002-154815 A | | 5/2002 |
| JP | 2008-066125 A | | 3/2008 |
| JP | 2010-153296 A | | 7/2010 |
| WO | WO 2007/088979 | * | 8/2007 |

OTHER PUBLICATIONS

Chinese first Office Action for corresponding CN Patent Application No. 200980137259.8 issued on Jan. 28, 2013.
Li Ying et al.:"A novel S-containing composite material for the cathodes of lithium batteries", Chinese Journal of Power Sources, vol. 28, No. 5, pp. 262-263, May 2004.
Office Action issued Oct. 9, 2012, in corresponding Korean patent application No. 2011-7008472 with partial translation.
Wang et al., "Sulfur Composite Cathode Materials for Rechargeable Lithium Batteries", Adv. Funct. Mater. 2003, 13, No. 6, June, pp. 487-492.
Japanese Office Action for corresponding JP Patent Application No. 2010-533918 issued on Sep. 3, 2013.
Yu X-G et al: "Lithium storage in conductive sulfur-containing polymers", Journal of Electroanalytical Chemistry and Interfcial Electro Chemistry, Elsevier, Amsterdam, Netherlands, vol. 573, No. 1, Nov. 15, 2004, pp. 121-128, XP004607085, ISSN: 0022-0728, DOI: 10.1016/J.Jelechem.2004.07.004.
Wang J et al: "A Novel Conductive Polymer-Sulfur Composite Cathode Material for Rechargeable Lithium Batteries", Advanced Materials, Wiley VCH Verlag, Germany, vol. 14, No. 13/14, Jul. 4, 2002, pp. 963-965, XP001130563, ISSN: 0935-9648, DOI: 10.1002/1521-4095(20020704)14:13/14<963::A, ID-ADMA963<3.0.CO;2-S.
Flandrois S et al: "Carbon materials for lithium-ion rechargeable batteries", Carbon, Elsevier, Oxford, Great Britain, vol. 37, No. 2, Feb. 1, 1999, pp. 165-180, XP004158110, ISSN: 0008-6223, DOI: 10.1016/S0008-6223(98)00290-5.
X-M He et al: "Thermal analysis of sulfurization of polyacrylonitrile with elemental sulfur", Journal of Thermal Analysis and Calorimetry, Kluwer Academic Publishers, Dordrecht, Netherlands, vol. 94, No. 1, Aug. 12, 2008, pp. 151-155, XP019646343, ISSN 1572-8943, DOI: 10.1007/S10973-008-9008-0.
Extended International Search Report for corresponding EP Patent Application No. 09820615.4 dated Aug. 5, 2013.
Yoshio Uetani, "Polymer Lithium Battery", CMC Publishing Co., Ltd., 1999, pp. 137-147.

* cited by examiner

SULFUR-MODIFIED POLYACRYLONITRILE, MANUFACTURING METHOD THEREFOR, AND APPLICATION THEREOF

TECHNICAL FIELD

The present invention relates to a method of manufacturing sulfur-modified polyacrylonitrile used for a cathode active material of a lithium secondary battery (so called lithium rechargeable battery), sulfur-modified polyacrylonitrile manufactured by the method, and a lithium secondary battery comprising the sulfur-modified polyacrylonitrile as a cathode active material.

BACKGROUND ART

A lithium secondary battery is a secondary battery which has high charge-discharge capacity and can exhibit high power. Currently, a lithium secondary battery is mainly being used as a power source for portable electronic appliances, and is expected to be used as a power source for electric automobiles predicted to be used more in the future. However, when a lithium secondary battery is used as a power source for portable electronic appliances, particularly, a power source for automobiles, it is required to reduce costs and space. Further, a lithium secondary battery currently and mainly being used as the power source for portable electronic appliances is also being required to become short, small, light and thin.

Among currently-used lithium secondary batteries, lithium secondary batteries, which are manufactured using rare resources, called rare metals such as cobalt, nickel and the like, as cathode materials, are being chiefly used. Therefore, battery materials advantageous in terms of resources are desired.

Sulfur is a resourceful and inexpensive material. Moreover, when sulfur is used as a cathode active material for a lithium secondary battery, it is theoretically expected that the cathode active material is a material having a maximum capacity among well-known cathode materials and that the cathode active material has an electric capacitance about six times larger than that of a lithium cobalt oxide cathode material which is the most frequently used among currently commercially-available cathode materials. Therefore, it is required to put sulfur to practical use as a cathode material.

However, a compound of sulfur with lithium is soluble in a nonaqueous solvent, such as ethylene carbonate, dimethyl carbonate or the like, which is used as a nonaqueous electrolyte for a lithium secondary battery. Therefore, when this compound is used as a cathode material, there is a problem in that this compound is gradually deteriorated by the elution of the composition to an electrolyte, thus decreasing the capacity of a battery. For this reason, methods of preventing the elution of the compound to an electrolyte using a polymer electrolyte or a solid electrolyte have been reported. However, these methods are also problematic in that the electric resistance of a battery becomes high, so that it is difficult to operate the battery at room temperature or a low temperature, with the result that the battery must be operated at high temperature, and the power of the battery becomes low.

Therefore, if the elution of sulfur to a nonaqueous solvent can be prevented and a sulfur-containing material can be practically used as a cathode material of a lithium secondary battery, it is possible to increase the capacity of a lithium secondary battery, decrease the weight thereof and reduce the space thereof. Further, if an electrolyte composed of a nonaqueous solvent, not a polymer electrolyte or a solid electrolyte, is used, it is possible to operate the battery even at room temperature or a low temperature.

As an attempt to prevent the elution of sulfur to a nonaqueous solvent, a sulfur-containing polymer having a —CS—CS— bond or a —S—S— bond has been proposed (refer to non-patent document 1 below). However, when this sulfur-containing polymer is used as a cathode material, lithium (Li) bonds with sulfur (S), so that the polymer is cut, thereby losing reaction reversibility. Therefore, there is a problem in that the cycle life characteristics of a battery deteriorate.

Further, a polymer lithium battery including carbon polysulfide essentially consisting of carbon and sulfur is disclosed in patent document 1 below. Such a polymer lithium battery including the carbon polysulfide is considered to have good stability and excellent charge-discharge cycle life characteristics. However, in the case of Example 9 in which aluminum foil is used as a collector, it cannot be expected that the cycle life characteristics of the polymer lithium battery were sufficiently improved, considering that the discharge capacity of the polymer lithium battery was 610 mAh/g per active material at the 10th charge-discharge cycle, whereas the discharge capacity thereof was decreased to 146 mAh/g at the 50th charge-discharge cycle. The reason for this may be that the carbon polysulfide has a structure in which sulfur is added to a straight-chain unsaturated polymer, so that the —CS—CS— bond and/or —S—S— bond of the carbon polysulfide is easily cut, with the result that the carbon polysulfide is converted into a low-molecular-weight polymer, thereby causing the low-molecular-weight polymer to be dissolved in an electrolyte, during the charge-discharge cycles.

Further, there is a problem in that it requires a multi-step process and a lot of time to synthesize the carbon polysulfide because the synthesis method of the carbon polysulfide is very complicated. Moreover, the carbon polysulfide does not have sufficient conductivity. Therefore, when the carbon polysulfide is used as a cathode active material, there are problems in that it is required to add a large amount of an auxiliary conductivity agent and in that the capacity of the polymer lithium battery per electrode weight becomes low.

CITED REFERENCE

Patent Document

Patent document 1: Japanese Unexamined Patent Application Publication No. 2002-154815

Non-Patent Document

Non-patent document 1: Polymer lithium battery, written by Yoshio UETANI, published by CMC Inc.

SUMMARY OF INVENTION

Technical Problem

Accordingly, the present invention has been made to solve the above-mentioned problems, and an object of the present invention is to put inexpensive and high-capacity expectable sulfur to practical use as a cathode material for a lithium secondary battery, and, particularly, to provide a sulfur-containing cathode material which can exhibit high power, has excellent cycle life characteristics and other characteristics and can use a general nonaqueous electrolyte. Further, another object of the present invention is to provide a method of realizing a high-capacity cathode using the sulfur-containing cathode material having such excellent properties.

Solution to Problem

In order to accomplish the above objects, the present inventors have done research eagerly. As a result, they found that, according to a method of mixing sulfur powder with polyacrylonitrile powder and then heating this mixture under a nonoxidative atmosphere while preventing the effluence of sulfur, sulfur vapor reacts with polyacrylonitrile simultaneously with the ring-closing reaction of polyacrylonitrile, thus obtaining sulfur-modified polyacrylonitrile. Further, they found that the sulfur-modified polyacrylonitrile obtained in this way maintains sulfur's own high capacity and has excellent cycle life characteristics because the elution of sulfur to a nonaqueous solvent is inhibited. Further, they found that, when sulfur powder is mixed with polyacrylonitrile powder, and then the mixture is charged in a collector for a cathode and then heated, the sulfur-modified polyacrylonitrile is obtained, and simultaneously the obtained sulfur-modified polyacrylonitrile can be integrated with a collector without using a binder, and thus the reduction in capacity of a battery per electrode weight attributable to the use of a binder can be prevented, thereby obtaining a cathode for a lithium secondary battery having excellent performance. Based on these findings, the present invention was completed.

That is, the present invention provides a method of manufacturing sulfur-modified polyacrylonitrile, sulfur-modified polyacrylonitrile manufactured by the method, a cathode for a lithium secondary battery comprising the sulfur-modified polyacrylonitrile as a cathode active material, and a lithium secondary battery comprising the cathode.

1. A method for manufacturing sulfur-modified polyacrylonitrile, comprising: mixing a base powder comprising sulfur powder and polyacrylonitrile powder; and heating the base powder under a nonoxidative atmosphere while preventing the effluence of sulfur vapor.

2. The method according to claim 1, wherein the base powder is heated in a closed atmosphere.

3. The method according to claim 1, wherein the base powder is heated while refluxing sulfur vapor in a reaction container having an opening for discharging hydrogen sulfide produced by a reaction.

4. The method according to any one of claims 1 to 3, wherein the base powder further includes an auxiliary conductivity agent made of a high-crystallinity carbon material.

5. The method according to any one of claims 1 to 4, wherein the base powder is heated to a temperature of 250~500 degree Celsius.

6. The method according to anyone of claims 1 to 5, further comprising: heating the Sulfur-modified polyacrylonitrile heated by the method of any one of claims 1 to 5 to a temperature of 150~400 degree Celsius under a nonoxidative atmosphere.

7. Sulfur-modified polyacrylonitrile, manufactured by the method of any one of claims 1 to 6, wherein the Raman spectrum has a major peak in the vicinity of 1331 $cm^{-1}$ of Raman shift, and has other peaks in the vicinity of 1548 $cm^{-1}$, 939 $cm^{-1}$, 479 $cm^{-1}$, 381 $cm^{-1}$, 317 $cm^{-1}$ in a Raman shift range of 200 $cm^{-1}$~1800 $cm^{-1}$.

8. A cathode for a lithium secondary battery, comprising the sulfur-modified polyacrylonitrile according to claim 7 as an active material.

9. A method of manufacturing a cathode for a lithium secondary battery, comprising: charging a base powder comprising sulfur powder and polyacrylonitrile powder in a collector made of a porous material; and heating the base powder under a nonoxidative atmosphere while preventing the effluence of sulfur vapor.

10. The method according to claim 9, wherein the collector made of a porous material is a nonwoven or woven fabric made of a carbon material having high degree of graphitization.

11. The method according to claim 9 or 10, wherein the base powder further includes an auxiliary conductivity agent made of a high-crystallinity carbon material.

12. A cathode for a lithium secondary battery, manufactured by the method according to any one of claims 9 to 11.

13. The method of manufacturing a cathode for a lithium secondary battery, comprising: heating the cathode according to claim 8 or 12 to a temperature of 150~400 degree Celsius under a nonoxidative atmosphere.

14. A lithium secondary battery, comprising the cathode according to claim 8 or 12.

15. A lithium secondary battery, comprising: the cathode according to claim 8 or 12; and an anode including an anode material containing no lithium as an active material, wherein one or both of the cathode and the anode is pre-doped with lithium.

BEST MODE

Hereinafter, a method of manufacturing sulfur-modified polyacrylonitrile used for a cathode active material for a lithium secondary battery, sulfur-modified polyacrylonitrile manufactured by the method, a cathode for a lithium secondary battery comprising the sulfur-modified polyacrylonitrile as a cathode active material, and a lithium secondary battery comprising the cathode will be described in detail. Here, it is preferred that a carbon material having a high degree of graphitization and a carbon material having high crystallinity do not contain hydrogen or contain a small amount of hydrogen.

Method of Manufacturing Sulfur-Modified Polyacrylonitrile (1) Raw Material

In the method of present invention, sulfur powder and polyacrylonitrile powder is used as a raw material.

The particle size of sulfur powder may be, but is not particularly limited to, the range of 150 μm~40 μm, preferably, 100 μm~40 μm, when it is classified using a sieve.

Polyacrylonitrile powder may have a weight average molecular weight of 10,000~300,000. Further, polyacrylonitrile powder may have a particle size of 0.5~50 μm, preferably, 1~10 μm, when it is observed using an electron microscope.

The mixing ratio of sulfur powder to polyacrylonitrile powder may be determined such that the amount of sulfur powder is 50~1000 parts by weight, preferably, 50~500 parts by weight, and more preferably, 150~350 parts by weight, based on 100 parts by weight of polyacrylonitrile powder. However, the present invention is not particularly limited thereto.

(2) Method of Manufacturing Sulfur-Modified Polyacrylonitrile

In the method of the present invention, a base powder including sulfur powder and polyacrylonitrile powder as a raw material is heated under a nonoxidative atmosphere while preventing the effluence of sulfur. As a result, the ring-closing reaction of polyacrylonitrile occurs, and simultaneously sulfur vapor reacts with polyacrylonitrile, thus obtaining sulfur-modified polyacrylonitrile.

As an example of the methods of heating the base powder while preventing the effluence of sulfur, a method of heating the base powder under a closed atmosphere may employed. In this case, the closed atmosphere must be maintained such that sulfur vapor generated by heating does not dissipate.

Further, the nonoxidative atmosphere, which is a depressurized state in which the concentration of oxygen is reduced to such a degree that an oxidation reaction is not conducted, may be an inert gas (nitrogen, argon or the like) atmosphere or a sulfur gas atmosphere.

The detailed method for making the closed nonoxidative atmosphere is not particularly limited. For example, a raw material is put into a container in which airtightness is maintained to such a degree that sulfur vapor does not dissipate, and is than heated in the container in a decompressed state or inert gas atmosphere. In addition, a mixture of sulfur powder and polyacrylonitrile powder may be heated in a state in which it is wrapped with a material which does not react with sulfur vapor, such as an aluminum laminate film or the like. In this case, in order that the wrapping material may not be damaged by sulfur vapor, for instance, it is preferred that a raw material is put into a pressure-resistant container, such as an autoclave or the like, charged with water and is then heated to produce water vapor, and then the wrapping material is externally pressured by the produced water vapor. According to this method, since the wrapping material is externally pressured by water vapor, it is possible to prevent the wrapping material from being inflated and damaged by sulfur vapor.

Sulfur powder and polyacrylonitrile powder may be only mixed, but may also be formed into pellets.

Heating temperature may be 250~500 degree Celsius, preferably 250~400 degree Celsius, and more preferably 250~300 degree Celsius.

Heating time may be 10 minutes~10 hours, preferably, 30 minutes~6 hours at the above heating temperature although it is not particularly limited and is changed depending on the actual heating temperature. In the method of present invention, it is possible to form sulfur-modified polyacrylonitrile in a short period of time.

Further, as another method of heating the base powder while preventing the effluence of sulfur, a method of heating a base powder including sulfur powder and polyacrylonitrile powder while refluxing sulfur vapor in a reaction container having an opening for discharging hydrogen sulfide produced by by a reaction may be employed. In this case, the opening for discharging hydrogen sulfide may be disposed at the position at which sulfur vapor is completely liquefied and refluxed to prevent sulfur vapor from being discharged through the opening. For example, when the opening is disposed at the position at which the temperature of the reaction container may be 100 degree Celsius or lower, hydrogen sulfide produced by a reaction is discharged to the outside through the opening, but sulfur vapor condenses around the opening and then returns to the reaction container without being discharged to the outside.

FIG. 1 is a schematic view showing a reactor which can be used in this method. In the reactor shown in FIG. 1, a reaction container filled with a base powder is disposed in an electric furnace, and the upper portion of the reaction container protrudes out of the electric furnace. In this reactor, the temperature of the upper portion of the reaction container is lower than that of the reaction container disposed in the electric furnace. In this case, the temperature of the upper portion of the reaction container may be a temperature at which sulfur vapor is liquefied. As shown in FIG. 1, the reaction container is provided at the top thereof with a silicon rubber plug, and this silicon rubber plug is provided with an opening for discharging hydrogen sulfide and an opening for introducing inert gas. Further, the silicon rubber plug is provided with a thermocouple for measuring the temperature of a raw material. The silicon rubber plug is convex downward, and sulfur vapor condenses and liquefies at this convex portion of the silicon rubber plug and then drops onto the bottom of the reaction container. The reaction container may be made of an alumina Tammann tube, a heat resistant glass tube or the like which is resistant to the heat and/or corrosion caused by sulfur. The silicon rubber plug is treated with fluorine resin tape in order to prevent corrosion.

In order to create a nonoxidative atmosphere in the reaction container, for instance, in the early stage of heating, inert gas, such as nitrogen, argon, helium or the like, is introduced into the reaction container through an inert gas feed pipe to create an inert gas atmosphere. Subsequently, since sulfur vapor is slowly generated as the temperature of a raw material increases, in order to prevent the inert gas feed pipe from being blocked by precipitated sulfur, the inert gas feed pipe may be closed when the temperature of the raw material becomes 100 degree Celsius or higher. Thereafter, inert gas is discharged to the outside together with hydrogen sulfide produced by heating the raw material. As a result, atmosphere in the reaction container becomes sulfur vapor atmosphere, mainly.

In this case, heating temperature, the same as in the above method of heating a raw material in a closed atmosphere, may be 250~500 degree Celsius, preferably 250~400 degree Celsius, and more preferably 250~300 degree Celsius. Reaction time, the same as in the above method, may be 10 minutes~10 hours at a temperature of 250~500 degree Celsius. Generally, when the temperature in the reaction container reaches the above temperature and then heating stops, the temperature in the reaction container is maintained for a time necessary for the above temperature range to be maintained, because the reaction go with an exothermic reaction. Further, it is required to control heating conditions such that the maximum temperature including the above mentioned temperature-up caused by exothermic reaction reaches the above heating temperature. Further, since an exothermic reaction occurs, it is preferred that the rate of temperature increase be 10 degree Celsius/min or less.

In this method, since excess hydrogen sulfide produced by the reaction is removed, the reaction container is filled with liquid sulfur and sulfur vapor, and thus the reaction of sulfur powder with polyacrylonitrile powder can be accelerated compared to when the reaction is performed in the closed reaction container.

The hydrogen sulfide discharged from the reaction container can be passed through hydrogen peroxide water or an aqueous alkali solution to precipitate sulfur, and this sulfur precipitate may be treated.

After the temperature in the reaction container reaches a predetermined reaction temperature, heating can be stopped and natural cooling can be conducted to obtain a mixture of sulfur-modified polyacrylonitrile and sulfur, and sulfur-modified polyacrylonitrile is extracted from the mixture.

According to the method of the present invention, sulfur-modified polyacrylonitrile having high electric capacitance can be easily obtained.

(3) Sulfur-Modified Polyacrylonitrile

According to the above method, the ring-closing reaction of polyacrylonitrile and the reaction of sulfur with polyacrylonitrile occur simultaneously to obtain sulfur-modified polyacrylonitrile.

As a result of elemental analysis, the obtained sulfur-modified polyacrylonitrile includes carbon, nitrogen and sulfur, and may further include a small amount of oxygen and hydrogen.

Among the above methods of manufacturing sulfur-modified polyacrylonitrile, according to the method of manufacturing sulfur-modified polyacrylonitrile by heating a raw material in a closed atmosphere, the obtained sulfur-modified polyacrylonitrile includes 40~60 wt % of carbon, 15~30 wt % of sulfur, 10~25 wt % of nitrogen, and 1~5 wt % of hydrogen, as a result of elemental analysis.

Further, among the above methods of manufacturing sulfur-modified polyacrylonitrile, in the method of manufacturing sulfur-modified polyacrylonitrile by heating a raw material while discharging hydrogen sulfide gas, the manufactured sulfur-modified polyacrylonitrile include larger amount of sulfur than another method. From the results of elemental analysis and the results of calculating a peak area ratio by XPS measurement, the obtained sulfur-modified polyacrylonitrile was shown to include 25~50 wt % of carbon, 25~55 wt % of sulfur, 10~20 wt % of nitrogen, 0~5 wt % of oxygen, and 0~5 wt % of hydrogen. When the sulfur-modified polyacrylonitrile including a large amount of sulfur, obtained in this way, is used as a cathode active material, electric capacitance increases.

Further, in the sulfur-modified polyacrylonitrile obtained by the method of the present invention, according to the result of thermogravimetric analysis when it is heated from room temperature to 900 degree Celsius at a temperature increase rate of 20 degree Celsius/min, the reduction of the weight thereof is 10% or less at 400 degree Celsius. Meanwhile, when a mixture of sulfur powder and polyacrylonitrile powder is heated under the same condition as the sulfur-modified polyacrylonitrile, the weight of the mixture starts to decrease at about 120 degree Celsius, and rapidly decreases at 200 degree Celsius or higher due to the loss of sulfur.

Further, as a result of the X-ray diffraction analysis of the sulfur-modified polyacrylonitrile using CuKα ray, only a broad peak is observed at a diffraction angle (2θ) near 20°~30° because a peak based on sulfur is lost.

From these points of view, it is considered that, in the obtained sulfur-modified polyacrylonitrile, sulfur does not exist as a single body, but exists in a state in which it is bonded with the ring-closed polyacrylonitrile.

FIG. 2 shows an example of a Raman spectrum of the sulfur-modified polyacrylonitrile obtained by using 200 parts by weight of sulfur atoms based on 100 parts by weight of polyacrylonitrile. In the Raman spectrum of the sulfur-modified polyacrylonitrile, there is a major peak in the vicinity of 1331 $cm^{-1}$ of the Raman shift, and there are other peaks in the vicinity of 1548 $cm^{-1}$, 939 $cm^{-1}$, 479 $cm^{-1}$, 381 $cm^{-1}$, 317 $cm^{-1}$ in a Raman shift range of 200 $cm^{-1}$~1800 $cm^{-1}$. The peaks in the Raman shift are observed at the same peak positions even when the ratio of sulfur atoms to polyacrylonitrile is changed, and represent the characteristics of the sulfur-modified polyacrylonitrile obtained by the method of the present invention. These peaks may exist in a range of about ±8 $cm^{-1}$ from the center of their respective peak positions. Further, the Raman shift is measured using RMP-320 (exciting wavelength λ=532 nm, grating: 1800 gr/mm, resolution: 3 $cm^{-1}$) manufactured by JASCO Corporation. Further, in the Raman spectrum, the number of peaks may be changed or the position of the top of a peak may be out of alignment because of a difference in the wavelength or resolution of the incident light.

The sulfur-modified polyacrylonitrile exhibits high capacity as a cathode active material for a lithium secondary battery because of the content of sulfur included therein. That is, the sulfur-modified polyacrylonitrile exhibits an electric capacitance of about 740 mAh/g, which is about five times or more that of a conventional cathode material using $LiCoO_2$.

In the sulfur-modified polyacrylonitrile obtained by the above method, when polyacrylonitrile, which is a raw material of this sulfur-modified polyacrylonitrile, is heated, the ring-closing reaction of polyacrylonitrile occurs. In this case, this ring-closing reaction proceeds while forming a three-dimensional condensed ring. Therefore, polyacrylonitrile is mixed with sulfur, and then the mixture is heated to form a sulfur-modified polyacrylonitrile structure in which polyacrylonitrile is three-dimensionally cross linked, thus preventing the elution of sulfur active material to an electrolyte in a charge-discharge cycle.

Accordingly, the elution of the sulfur-modified polyacrylonitrile to a nonaqueous electrolyte is prevented, so that the cycle life can be improved, and a battery can be fabricated using a conventional nonaqueous electrolyte for a lithium secondary battery, thereby greatly improving a practical value.

(4) Heat Treatment Process

When the sulfur-modified polyacrylonitrile obtained by the above method is further heated in a nonoxidative atmosphere, unreacted sulfur remaining therein can be removed. Thus, high-purity sulfur-modified polyacrylonitrile can be obtained. Further, the charge-discharge cycle life characteristics of the sulfur-modified polyacrylonitrile are more improved after heat treatment.

For example, the nonoxidative atmosphere may be a depressurized state in which oxygen concentration is reduced to such a degree that an oxidation reaction does not proceed, or may be an inert gas (nitrogen, argon or the like) atmosphere.

The heating temperature may be 150~400 degree Celsius, preferably 150~300 degree Celsius, and more preferably 200~300 degree Celsius. When heating time excessively increases, the sulfur-modified polyacrylonitrile can be decomposed. Therefore, careful attention is required.

The heat treatment time, but not particularly limited, may be 1~6 hours.

Cathode for Lithium Secondary Battery

The above sulfur-modified polyacrylonitrile can be usefully used as a cathode active material for a lithium secondary battery. A cathode manufactured using the sulfur-modified polyacrylonitrile may have the same structure as a cathode for a general lithium secondary battery.

For example, the cathode may be fabricated by mixing the sulfur-modified polyacrylonitrile obtained by the above method with an auxiliary conductivity agent such as acetylene black (AB), Ketjen black (KB), vapor grown carbon fiber (VGCF) or the like, a binder such as polyvinylidene fluoride (PVDF), polytetrafluoroethylene (PTFE), styrene-butadiene rubber (SBR) or the like, and a solvent such as N-methyl-2-pyrrolidone (NMP) or the like to form paste, and then applying the paste onto a collector. The amount of the auxiliary conductivity agent used may be, but is not limited to, 20~100 parts by weight based on 100 parts by weight of the sulfur-modified polyacrylonitrile. The amount of the binder used may be, but is not limited to, 10~20 parts by weight based on 100 parts by weight of the sulfur-modified polyacrylonitrile. In addition to this method, the cathode may also be fabricated by mixing the sulfur-modified polyacrylonitrile with the auxiliary conductivity agent and the binder, kneading the mixture using mortar and/or a press to form a film, and then pressing the film onto a collector using the press.

Examples of the collector may include, but are not limited to, aluminum foil, aluminum mesh, stainless steel mesh and the like, which are materials generally used as a cathode for a lithium secondary battery. Further, since the sulfur-modified polyacrylonitrile is used at a relatively low voltage range of 1~3 V, nickel-based collectors, for example, nickel foam, nickel nonwoven fabric and the like, which could not be used because they can become dissolved due to the high potential range when lithium cobalt oxide is used as an active material. Particularly, nonwoven fabric, woven fabric or the like, which is made of a carbon material having a high degree of graphitization, is suitable for the collector because its reactivity to sulfur is low. The carbon material having a high degree of graphitization may not include hydrogen having high reactivity to sulfur, and can be obtained by heat-treating pitch (a by-product of petroleum, coal, coal tar or the like) or polyacrylonitrile (PAN) fiber, which is a raw material of carbon fiber, using the same method as in the treatment of carbon fiber, that is, under a nonoxidative atmosphere at a temperature of 2000 degree Celsius~3200 degree Celsius and then removing hydrogen to increase the graphitization degree. The heat treatment time may be, but is not limited to, 10 minutes~10 hours. In this case, the nonoxidative atmosphere may be the same as that of the above heat treatment process. Further, the heat treatment temperature may become low, and the heat treatment time may become short, as long as hydrogen can be completely removed.

Further, in the auxiliary conductivity agent, since a carbon material having high crystallinity, such as vapor grown carbon fiber (VGCF), carbon nanotubes, graphite or the like, does not inhibit the production reaction of sulfur-modified polyacrylonitrile accompanying the ring-closing reaction of polyacrylonitrile, it is preferred that, when manufacturing the sulfur-modified polyacrylonitrile, the carbon material be heated together with sulfur powder and polyacrylonitrile powder in order to improve conductivity. In particular, it is preferred that the vapor grown carbon fiber (VGCF) have a diameter of 100 nm~500 nm and a length of 5 μm~20 μm. FIG. 3 is a schematic view showing the structure of the sulfur-modified polyacrylonitrile obtained by heat treatment together with an auxiliary conductivity agent. As shown in FIG. 3, in this method, a nano-level conductivity network can be established on the surface and/or in the space between the particles of sulfur-modified polyacrylonitrile having a particle diameter of several 100 nm, and a cathode active material having more excellent conductivity can be formed. In this case, the amount of the auxiliary conductivity agent may be, but is not limited to, 1~50 parts by weight, preferably, 5~20 parts by weight based on 100 parts by weight of the sum of sulfur powder and polyacrylonitrile powder. Since sulfur-modified polyacrylonitrile powder combined with the carbon material obtained in this way has good conductivity, when a cathode is formed by applying and attaching this sulfur-modified polyacrylonitrile powder to a collector, the amount of an auxiliary conductivity agent and/or a binder can be greatly reduced, and electrode capacitance density and/or electrode power density can be greatly improved.

When a porous material, such as carbon nonwoven fabric (carbon paper), carbon woven fabric, nickel foam, nickel nonwoven fabric or the like, is used as a collector, sulfur powder and polyacrylonitrile powder are charged in a collector and then heated under the above conditions to form sulfur-modified polyacrylonitrile in the collector. In this case, the sulfur-modified polyacrylonitrile can be integrated with the collector without using a binder. As a result, the cathode material obtained in this way has excellent cycle life characteristics, and a binder is not used, thus further improving electrode capacitance density and electrode power density. Further, sulfur powder and polyacrylonitrile powder are charged in a collector together with the above carbon material having high crystallinity and then heated to form a cathode material having excellent conductivity. In this case, the ratio of respective components may be such that sulfur powder is 50~500 parts by weight, preferably, 150~350 parts by weight, and the high-crystallinity carbon material as auxiliary conductivity agent is 1~50 parts by weight, based on 100 parts by weight of polyacrylonitrile powder.

As a method of charging the base powder in a porous collector, there is a method of mixing sulfur powder, polyacrylonitrile powder and, if necessary, a carbon material, putting the mixed powder onto the collector and then vibrating the collector or a method of charging the base powder in the pores of a collector by pressing the base powder using a spatula. In addition, there is a method of mixing sulfur powder, polyacrylonitrile powder and, if necessary, a carbon material, dispersing the mixed powder in a solvent such as N-methyl-2-pyrrolidone (NMP), alcohol or the like to form slurry, applying the slurry onto a collector and then vibrating the collector or a method of impregnating a collector with the base powder in a vacuum. Further, if necessary, the slurry may be repeatedly applied onto the collector. Thereafter, this collector is heated under the above conditions, that is, under a closed nonoxidative condition to form a cathode including sulfur-modified polyacrylonitrile integrated with a collector.

FIG. 4 is a schematic view showing the cathode obtained by the above method. As shown in FIG. 4, this cathode is an electrode in which sulfur-modified polyacrylonitrile is charged in the pores an electrode to be integrated with the electrode, in which the adhesion between an active material and a collector is excellent and which has excellent conductivity. For example, when carbon nonwoven fabric is used as a collector, sulfur-modified polyacrylonitrile can be charged in the fiber gap thereof.

Further, when nickel foam is used as a collector, nickel sulfide is formed on the interface between sulfur-modified polyacrylonitrile and nickel foam, thus more strongly maintaining an active material as a collector. Here, since nickel sulfide is a material which can also be used as a cathode active material for a lithium secondary battery, when a battery is fabricated using nickel sulfide, there is an advantage in that nickel sulfide contributes to the improvement of charge-discharge capacity of the battery.

Further, when carbon nonwoven fabric (carbon paper), carbon woven fabric or the like is used as a collector, particularly, the above-mentioned carbon nonwoven fabric (carbon paper) or carbon woven fabric made of a carbon material having high graphitization has low reactivity to sulfur. Therefore, when this nonwoven fabric (carbon paper) or carbon woven fabric is used as a collector, the synthesis of sulfur-modified polyacrylonitrile is not inhibited, thus obtaining an electrode having high conductivity.

Meanwhile, a porous collector made of aluminum, copper, iron or chromium is problematic in that, when the porous collector is charged with a raw material and reacted, the conductivity of an electrode is easily deteriorated by the formation of a surface film, and in that, when sulfur-modified polyacrylonitrile is synthesized by the reaction of sulfur with polyacrylonitrile, the porous collector inhibits this reaction. Therefore, this porous collector is not preferable for the above purpose.

Further, when the cathode obtained by attaching sulfur-modified polyacrylonitrile to a collector or by charging a collector with sulfur powder and polyacrylonitrile powder and then heating the collector is also heated under a nonoxidative atmosphere in the same manner as in the above heat treatment process, unreacted sulfur remaining in the cathode can be easily removed. Owing to this heat treatment, the elution of sulfur to an electrolyte can be prevented, thus preventing the deterioration of an electrode or a battery and improving the cycle life characteristics thereof.

The cathode for a lithium secondary battery according to the present invention, the shape and thickness thereof being not limited, may be charged with an active material and then compressed such that it has a thickness of 10~200 µm, preferably, 20~100 µm. Therefore, according to the kind, structure and the like of the collector used, the amount of an active material in the collector must be suitably adjusted such that the thickness of the compressed cathode is the same as the above thickness.

Lithium Secondary Battery

A lithium secondary battery using the above cathode may be manufactured using commonly-known methods. That is, the lithium secondary battery is manufactured by assembling known battery components while using the above mentioned material as a cathode material, using well known lithium metal, a carbon material such as graphite or the like, a silicon material such as silicon thin film or the like, or an alloy material such as copper-tin alloy, cobalt-tin alloy or the like as an anode material, and using a solution in which a lithium salt, such as lithium perchlorate, $LiPF_6$, $LiBF_4$, $LiCF_3SO_3$ or the like, is dissolved in a nonaqueous solvent, such as ethylene carbonate, dimethyl carbonate, propylene carbonate or the like, to a concentration of 0.5 mol/L~1.7 mol/L.

Further, when a material containing no lithium, for example, a carbon material, a silicon material or an alloy material, is used as an anode material, there is an advantage in that it is difficult for the formation of dendrite to cause a short between a cathode and an anode. However, in the case where this anode material containing no lithium is used, since both cathode and anode do not contain lithium when this anode material is used in combination with the cathode of the present invention, a lithium pre-doping treatment for previously charging lithium in one or both of the cathode and anode is required. The lithium pre-doping treatment may be conducted by a commonly-known method. For example, when an anode is pre-doped with lithium, lithium is used as a counter electrode to constitute a half cell, and then lithium is charged in the anode by an electrolytic doping method of electrochemically doping lithium or by an attaching pre-doping method of attaching lithium foil to an electrode and then leaving the electrode in an electrolyte to allow lithium to diffuse into the electrode, and then the half cell is combined with the counter electrode, thereby constituting a battery. Further, even when a cathode is pre-doped with lithium, the above electrolytic doping method may be used.

As the anode material without containing lithium, a silicon material, which is a high-capacity anode material, may be used, and, more preferably, silicon thin film may be used because it is advantageous in capacity per volume.

Advantageous Effects of Invention

The sulfur-modified polyacrylonitrile of the present invention is manufactured by using sulfur, which is a plentiful resource and an inexpensive material, as a raw material. When this sulfur-modified polyacrylonitrile is used a cathode active material of a lithium secondary battery, the cathode active material has high capacity and excellent cycle life characteristics because the elution of sulfur to a nonaqueous solvent is inhibited.

Further, in the method of manufacturing sulfur-modified polyacrylonitrile of the present invention, scaling up in the heat treatment in a closed reactor is easy, and industrial practicality is high.

Further, when a method of manufacturing sulfur-modified polyacrylonitrile by charging a raw material in a collector and then heating the raw material under a closed nonoxidative atmosphere is employed, the obtained sulfur-modified polyacrylonitrile can be integrated with a collector without using a binder, thus easily obtaining a cathode material having high capacitive density.

DESCRIPTION OF EMBODIMENTS

Hereinafter, the present invention will be described in detail with reference to the following Examples.

Example 1

1.0 g of sulfur powder having an average particle size of 50 μm and 0.50 g of polyacrylonitrile powder having an average particle size of 1 μm, which are starting materials, were mixed to form pellets having a diameter of 10 mm and a thickness of 5 mm. Subsequently, the pellets were wrapped with aluminum foil, and then additionally wrapped with aluminum laminate film. Then, the aluminum laminate film was fusion-bonded to obtain a sample in which raw material is enclosed.

The sample where raw material is enclosed and 80 mL of water were put into a 200 cc autoclave, and were then heated to 270 degree Celsius for 6 hours after the autoclave was tightly closed. At this time, the pressure in the autoclave was about 3.7 MPa. Subsequently, the sample was cooled to obtain a pellet-type black product.

The X-ray diffraction measurement of this product was conducted using CuKα ray emitted from an powder X-ray diffractometer (manufactured by MAC Science Corp., model number: M06XCE). This X-ray diffraction measurement of this product was conducted under the conditions of a voltage of 40 kV, an electric current of 100 mA, a scan rate of 4°/min, a sampling of 0.02°, an integration number of 1 and a diffraction angle (2θ) of 10°~60°.

Figure 5:
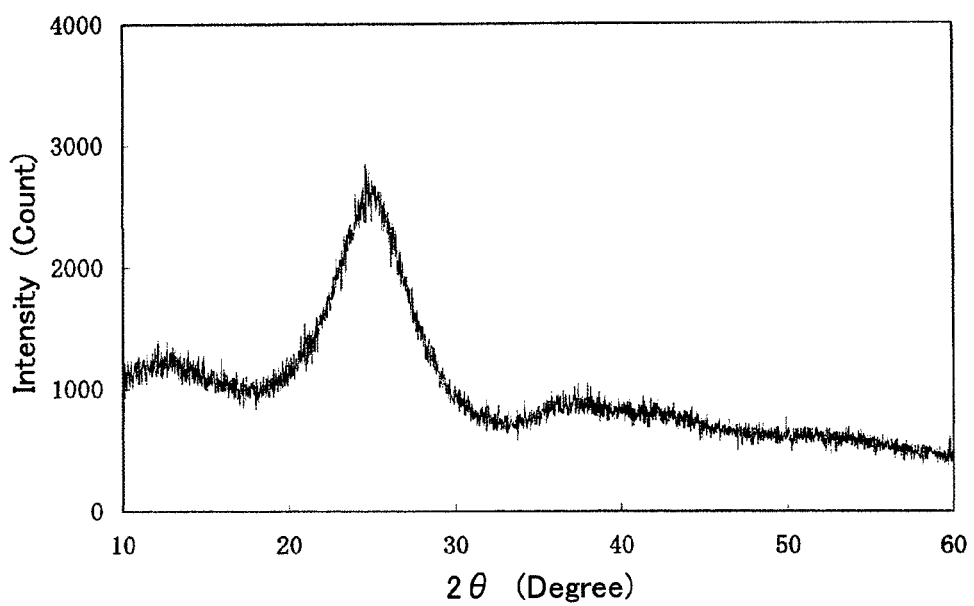
FIG. 5 is a graph showing an X-ray diffraction pattern of a product of Example 1.

FIG. 5 shows the obtained diffraction pattern. Only a broad diffraction peak was observed at about 25° in a diffraction angle (2θ) of 20°~30°.

Figure 2:
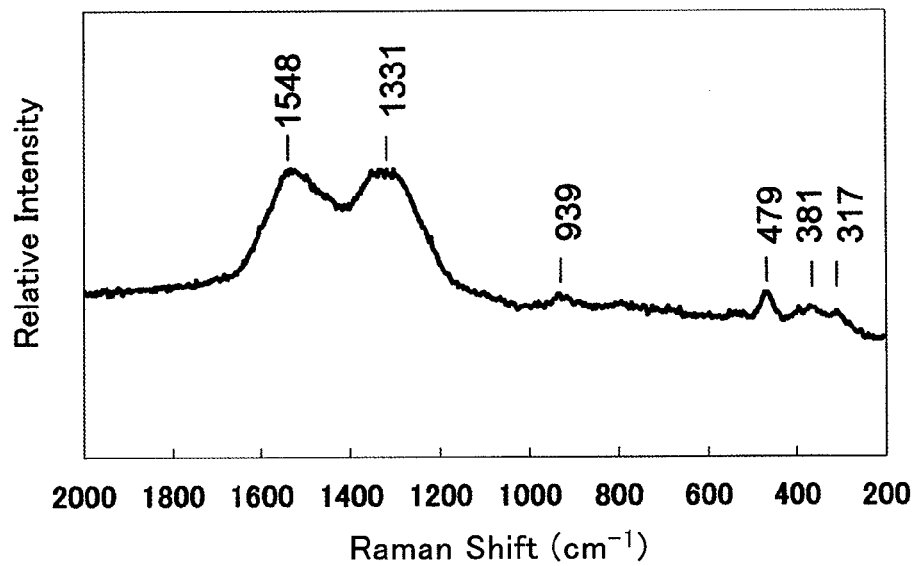
FIG. 2 is a graph showing a Raman spectrum of a product of Example 1.
Figure 3:
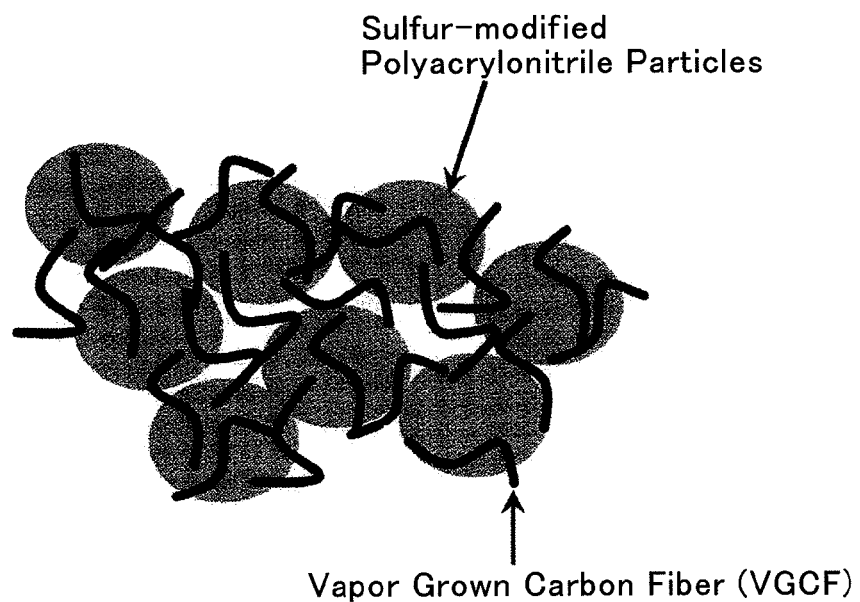
FIG. 3 is a view showing sulfur-modified polyacrylonitrile obtained by heat treatment together with an auxiliary conductivity agent.
Figure 4:
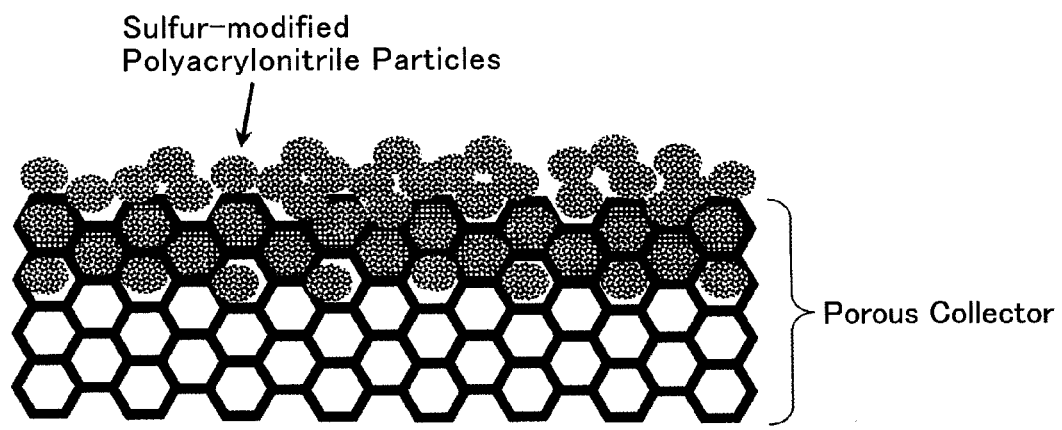
FIG. 4 is a view showing an electrode obtained by charging sulfur powder and polyacrylonitrile powder in a collector and then heating them.

Subsequently, Raman analysis of the product was conducted using RMP-320 (exciting wavelength λ=532 nm, grating: 1800 gr/mm, resolution: 3 cm$^{-1}$) manufactured by JASCO Corporation. FIG. 2 shows the Raman spectrum obtained in this way. In FIG. 2, the horizontal axis represents Raman shift (cm$^{-1}$), and the longitudinal axis represents relative intensity. As shown in FIG. 2, according to the results of Raman analysis of this sample, there is a major peak in the vicinity of 1331 cm$^{-1}$ of Raman shift, and there are other peaks in the vicinity of 1548 cm$^{-1}$, 939 cm$^{-1}$, 479 cm$^{-1}$, 381 cm$^{-1}$, 317 cm$^{-1}$ in a Raman shift range of 200 cm$^{-1}$~1800 cm$^{-1}$. This sample did not have C—S, N—S, S—S bonds observed generally in a range of 500~750 cm$^{-1}$. However, this fact is presumed that the position of peak is shifted under the influence of the unsaturated bonds of carbon and nitrogen (C=C, C=N bonds) derived from polyacrylonitrile.

Figure 6:
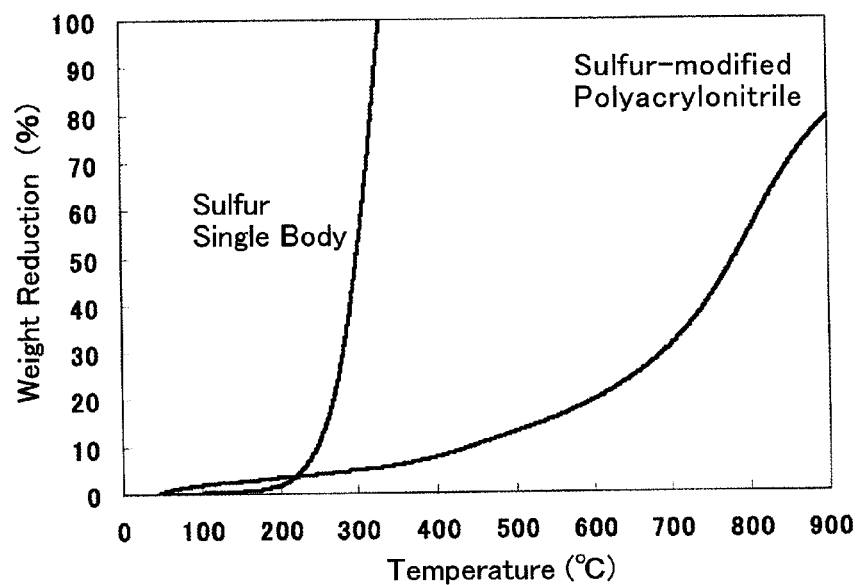
FIG. 6 is a graph showing the results of thermogravimetric analysis of a product of Example 1 and a sulfur single body.

Further, the thermogravimetric-differential thermal analysis of the product was conducted by heating the product at a temperature increase rate of 20 degree Celsius/min while blowing high-purity nitrogen gas at a flow rate of 0.15 L/min and then measuring the relation between temperature change and weight change using a thermogravimetric analyzer (model number: Thermo Plus TG 8120) manufactured by RIGAKU CORPORATION. The results thereof are shown in FIG. 6. Further, for comparison, the results of the thermogravimetric-differential thermal analysis of a sulfur single body are also shown in FIG. 6. From these results, it can be seen that the weight of the sulfur single body starts to decrease at about 120 degree Celsius and rapidly decreases at 200 degree Celsius or higher, whereas the weight of the obtained product slowly decreases to about 400 degree Celsius (the rate of the weight reduction thereof to 400 degree Celsius: about 10%) and the rate of the weight reduction thereof to 600 degree Celsius is about 20%. Therefore, it can be seen that this product is a stable compound.

Example 2

5.061 g of polyacrylonitrile powder and 25.008 g of sulfur powder were mixed with mortar to make a starting material. This raw material was put into an alumina Tammann tube (outer diameter: 60 mm, inner diameter: 50 mm, length: 180 mm, alumina SSA-S, manufactured by NIKKATO CORPORATION), which is used as a reaction container.

The opening of the alumina Tammann tube was capped with a silicon rubber plug (No. 15) fixed on a rubber adapter, and a portion of the silicon rubber plug, coming into contact with the atmosphere in the alumina Tammann tube was wound with fluorine resin tape such that the silicon rubber plug does not directly come into contact with the atmosphere in the alumina Tammann tube.

Three holes was made in the silicon rubber plug, and was provided with an alumina protection tube (outer diameter: 4 mm, inner diameter: 2 mm, length: 250 mm, alumina SSA-S, manufactured by NIKKATO CORPORATION) including a thermocouple therein and two alumina tubes (outer diameter: 6 mm, inner diameter: 4 mm, length: 150 mm, alumina SSA-S, manufactured by NIKKATO CORPORATION). The tip end of the thermocouple disposed in the alumina protection tube was brought into contact with a sample to measure the temperature of the sample. The two alumina tubes are used as an inert gas feed pipe and a gas discharge pipe, respectively, and are disposed such that they protrude out of the bottom of a cap to 3 mm. The inert gas feed pipe is connected with an argon gas pipe, and the gas discharge pipe is connected with a pipe which go through under the hydrogen peroxide water to serve as a hydrogen sulfide gas trap.

Figure 1:
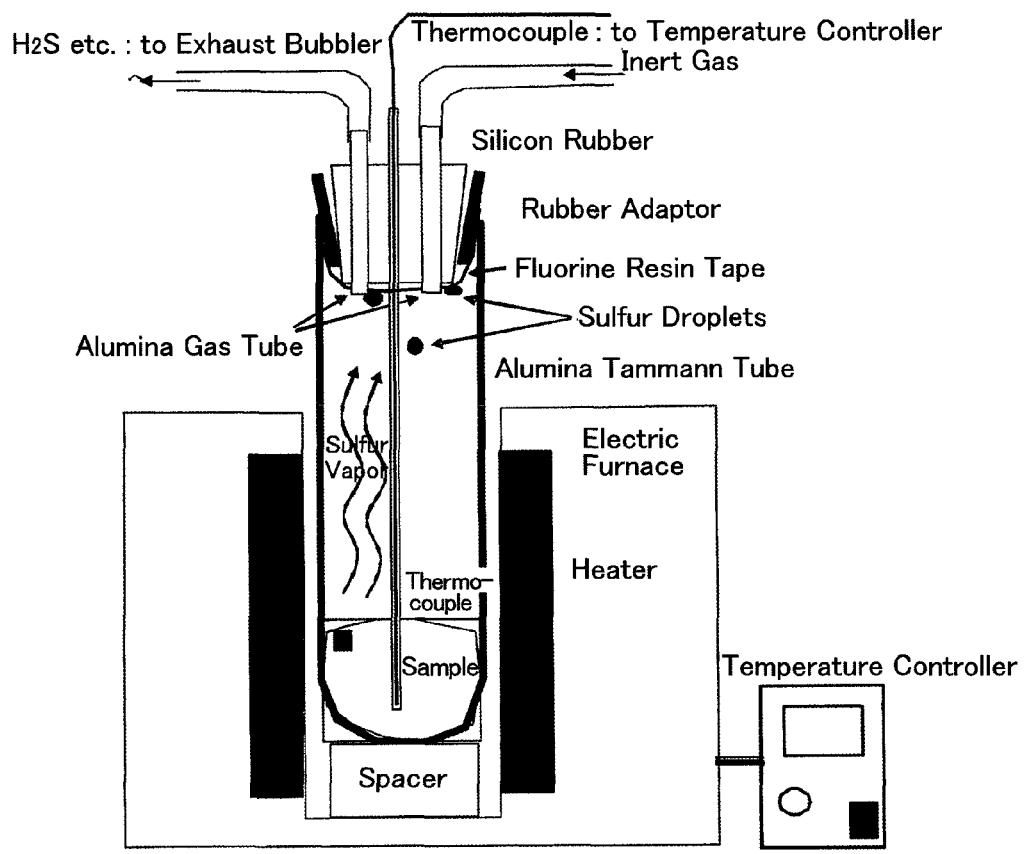
FIG. 1 is a schematic view showing a reactor used in Example 2.

Referring to the reactor shown in FIG. 1, the alumina Tammann tube was put into an electric furnace (crucible furnace, opening: 80 mm, heating head of alumina Tammann tube: 100 mm), and argon gas was blown into the alumina Tammann tube at a flow rate of 100 cc/min for 10 minutes. The sample disposed in the alumina Tammann tube was heated to 100 degree Celsius at a temperature increase rate of 5 degree Celsius/min, and the supply of argon gas was stopped at 100 degree Celsius. Exhaust gas was generated in the alumina Tammann tube from about 200 degree Celsius, and the heating of the sample was stopped at 360 degree Celsius. The temperature of the sample increased to 400 degree Celsius and then decreased thereafter. The sample was cooled to about room temperature and a product was extracted therefrom.

The unreacted sulfur remaining in the product was removed by the following procedures, that is, pulverizing the product using a mortar, putting 2 g of the pulverized product into a glass tube oven and then heating the product to 250 degree Celsius for 3 hours while keeping the glass tube oven under a vacuum condition. In this way, the unreacted sulfur was vaporized, thus obtaining sulfur-modified polyacrylonitrile.

As the result of the X-ray diffraction measurement of the obtained product, the same as in Example 1, only a broad diffraction peak was observed at about 25° in a diffraction angle (2θ) of 20°~30°.

Figure 7:
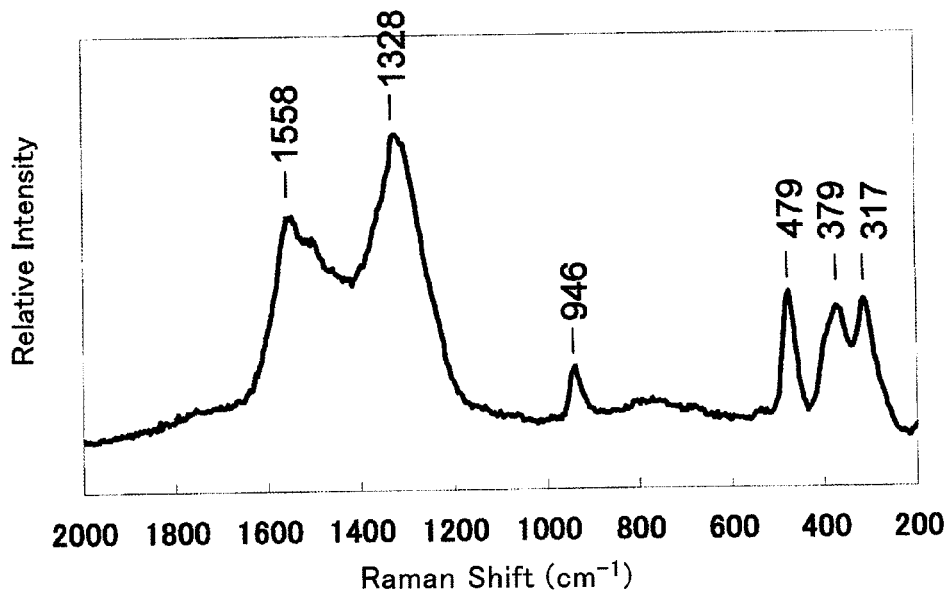
FIG. 7 is a graph showing a Raman spectrum of a product of Example 2.

Further, the Raman analysis of this product was conducted using RMP-320 (exciting wavelength λ=532 nm, grating: 1800 gr/mm, resolution: 3 cm$^{-1}$) manufactured by JASCO Corporation. FIG. 7 shows the Raman spectrum obtained in this way. In FIG. 7, the horizontal axis represents Raman shift (cm$^{-1}$), and the longitudinal axis represents relative intensity. As shown in FIG. 7, according to the results of Raman analysis of this sample, there is a major peak in the vicinity of 1328 cm$^{-1}$ of Raman shift, and there are other peaks in the vicinity of 1558 cm$^{-1}$, 946 cm$^{-1}$, 479 cm$^{-1}$, 379 cm$^{-1}$, 317 cm$^{-1}$ in a Raman shift range of 200 cm$^{-1}$~1800 cm$^{-1}$.

Example 3

The reaction product of sulfur powder and polyacrylonitrile powder was obtained in the same manner as in Example 1, except that the weight ratio of sulfur powder to polyacrylonitrile powder (S:PAN) was 2.5:1.

Figure 8:
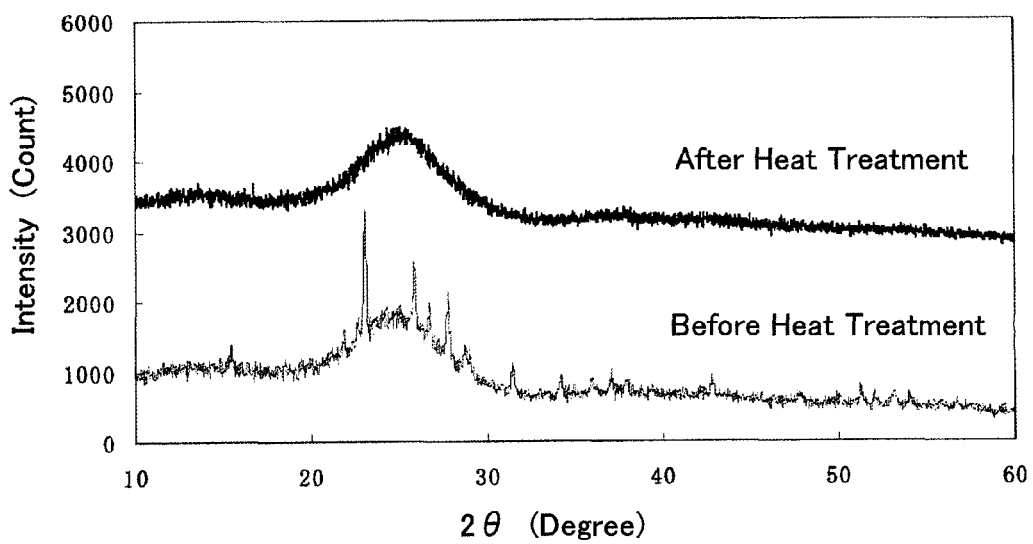
FIG. 8 is a graph showing an X-ray diffraction pattern of a product of Example 3.

FIG. 8 shows the diffraction pattern obtained by the X-ray diffraction measurement of this product. As shown in FIG. 8, abroad diffraction peak was observed at about 25° in a diffraction angle (2θ) range of 20°~30°, and a sharp peak showing the existence of a sulfur single body was observed at a diffraction angle (2θ) of 23.2°, 24.2°, 24.6°, 25.2°, 25.9°, 26.8°, 27.8°, 31.5°.

Subsequently, the X-ray diffraction measurement of this product was conducted after pulverizing this product into powder, putting the powdered product into a glass tube oven and then heating the powdered product to 250 degree Celsius for 6 hours while vacuuming the glass tube oven. The diffraction pattern of a sample after heat treatment is also shown in FIG. 8. In this sample, since only a broad diffraction peak was observed at about 25° in a diffraction angle (2θ) of 20°~30°, it was found that superfluous sulfur was lost. Further, even in Raman analysis and thermogravimetric analysis, the same spectrum pattern and thermogravimetric-differential thermal analysis results as in Example 1 were obtained.

Example 4

The reaction products of sulfur powder and polyacrylonitrile powder were obtained in the same manner as in Example 1, except that 300, 400, 600 or 800 parts by weight of sulfur powder was used based on 100 parts by weight of polyacrylonitrile powder.

Subsequently, each of the products was pulverized into powder, and then the powdered product was put into a glass tube oven and then heated to 250 degree Celsius for 6 hours while vacuuming the glass tube oven.

As the result of the X-ray diffraction measurement of each of the obtained products, the same as in Example 1, only a broad diffraction peak was observed at about 25° in a diffraction angle (2θ) of 20°~30°.

Figure 9:
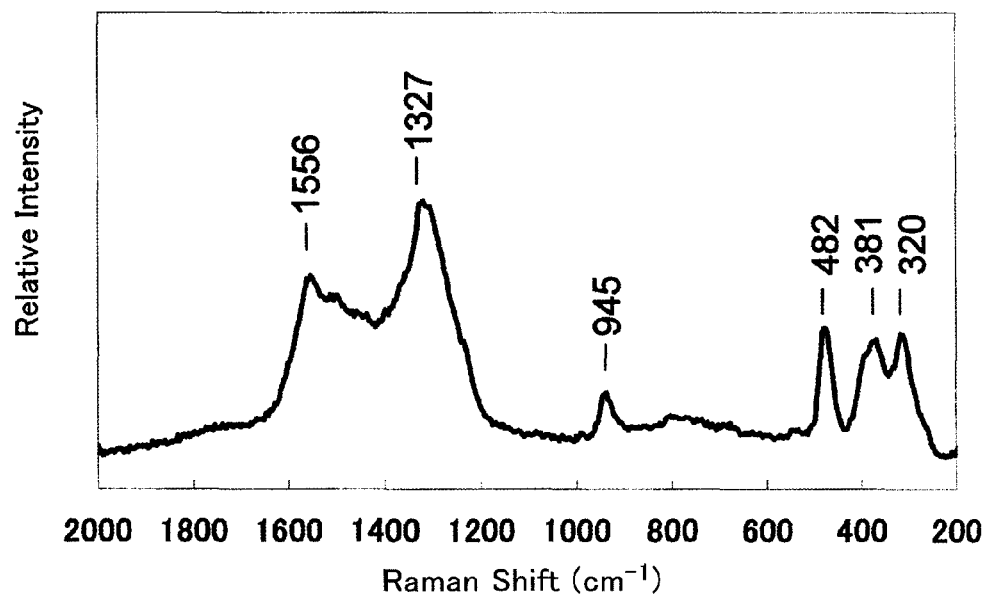
FIG. 9 is a graph showing a Raman spectrum of a product of Example 4.

The Raman analysis of the product, which is a product obtained using 400 parts by weight of sulfur powder based on 100 parts by weight of polyacrylonitrile powder and from which a sulfur single body was removed, was conducted using RMP-320 (exciting wavelength λ=532 nm, grating: 1800 gr/mm, resolution: 3 cm$^{-1}$) manufactured by JASCO Corporation. FIG. 9 shows the Raman spectrum obtained in this way. In FIG. 9, the horizontal axis represents Raman shift (cm$^{-1}$), and the longitudinal axis represents relative intensity. As shown in FIG. 9, according to the results of Raman analysis of this sample, there is a major peak in the vicinity of 1327 cm$^{-1}$ of Raman shift, and there are other peaks in the vicinity of 1556 cm$^{-1}$, 945 cm$^{-1}$, 482 cm$^{-1}$, 381 cm$^{-1}$, 320 cm$^{-1}$ in a Raman shift range of 200 cm$^{-1}$~1800 cm$^{-1}$.

Figure 10:
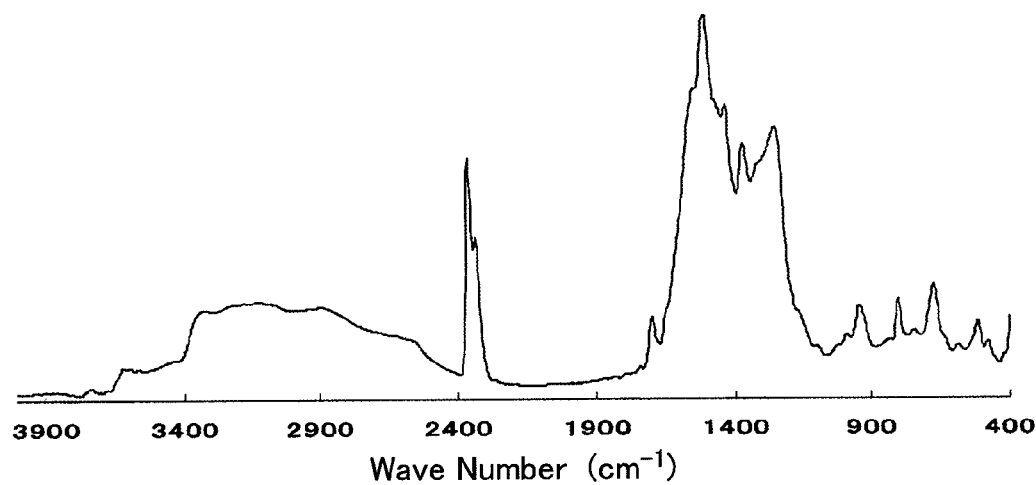
FIG. 10 is a graph showing an infrared (IR) spectrum of a product of Example 4.

Further, FIG. 10 shows the results of the infrared absorption measurement of this product using an infrared absorption spectrometer (model number: IRAffinity-1, manufactured by SHIMADZU CORPORATION). In FIG. 10, the horizontal axis represents wave number (cm$^{-1}$), and the longitudinal axis represents absorbance. In the IR spectrum of this obtained product, there are peaks in the vicinity of 474 (S—S), 516, 586, 628, 678 (C—S), 748, 806, 949 (S—S), 999, 1033, 1107 (C—C), 1176, 1257 (C=N), 1319, 1365 (C—C, C=C), 1435 (C=N), 1512, 1550 (C=C), 1705 (C=O), 2580, 2916, 3147, 3236, 3348, 3630, 3745 cm$^{-1}$. The infrared absorption measurement of this product was conducted using a diffuse reflectance method under the conditions of resolution: 4 cm$^{-1}$, integration number: 100, measuring range: 400 cm$^{-1}$~4000 cm$^{-1}$.

Figure 11:
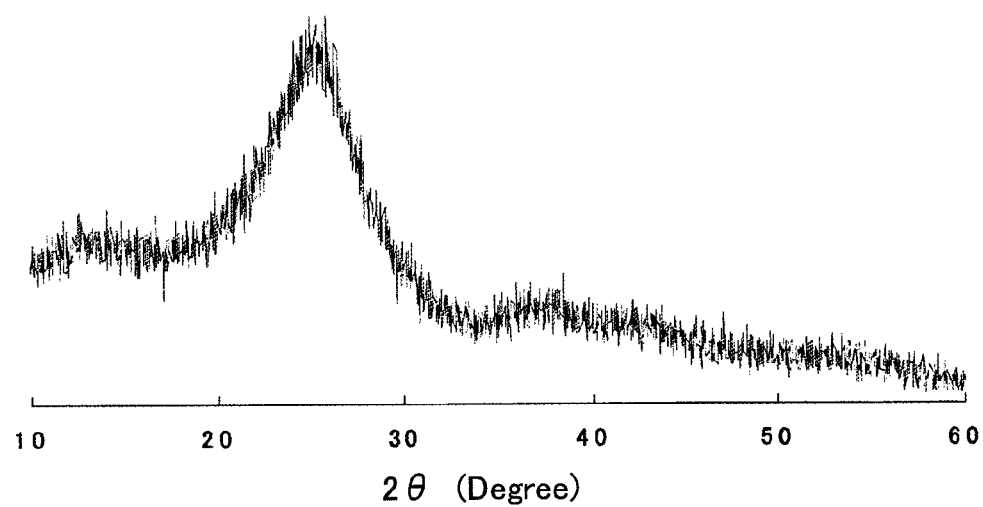
FIG. 11 is a graph showing an X-ray diffraction pattern of a product of Example 4.

Further, the X-ray diffraction measurement of this product was conducted using an X-ray diffractometer with CuKα ray (manufactured by MAC Science Corp., model number: M06XCE), and the results thereof are shown in FIG. 11. In FIG. 11, a broad scattered peak was observed at substantially about 25° in a diffraction angle (2θ) of 20°~30°. This X-ray diffraction measurement of this product was conducted under the conditions of a voltage of 40 kV, an electric current of 100 mA, a scan rate of 4°/min, a sampling of 0.02°, and an integration number of 1.

Figure 12:
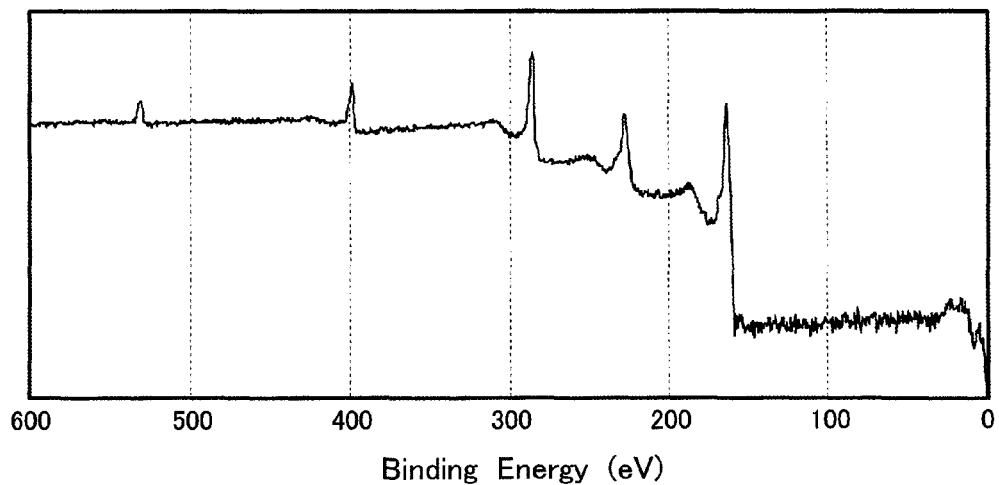
FIG. 12 is a graph showing an XPS spectrum of a product of Example 4.

Further, the X-ray photoelectron spectroscopy analysis of the product was conducted using an X-ray photoelectron spectrometer (AXIS-ULTRA, manufactured by SHIMADZU CORPORATION). This X-ray photoelectron spectroscopy analysis thereof was conducted using a monochromic AlX radiation source under the conditions of an electric current of 10 mA, a voltage of 15 kV, and a sampling step of 0.50 eV. FIG. 12 shows the obtained XPS spectrum. In this XPS spectrum, peaks were observed in the vicinity of 530 eV, 398 eV, 285 eV, 227 eV, and these peaks correspond to oxygen (O 1s), nitrogen (N 1s), carbon (C 1s), and sulfur (S 2p), respectively. Calculating the molar ratio of elements using the area of the peaks revealed that the molar ration of oxygen (O 1s):nitrogen (N 1s):carbon (C 1s):sulfur (S 2p) was 0.52:2.00: 8.40:2.17.

Further, the $^{13}$C CP/MAS NMR measurement of the product was conducted using a solid nuclear magnetic resonator (NMR) (model number: FNM-ECA 500, manufactured by JEOL LTD.). This $^{13}$C CP/MAS NMR measurement thereof was conducted under the conditions of a $^{13}$C resonance frequency of 125.77 MHz, a contact time of 2 ms, a MAS rate of 10 kHz and a repetition time of +5 s and under the condition that the integration number is counted until the desired spectrum is obtained.

Figure 13:
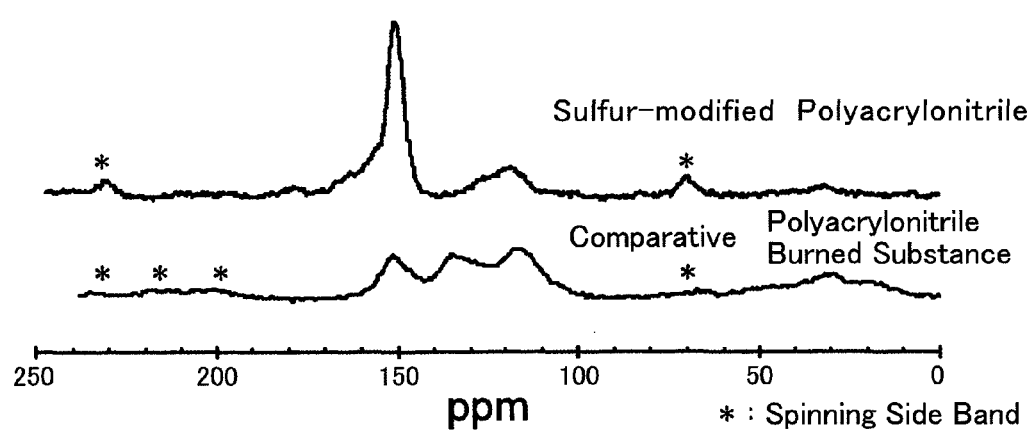
FIG. 13 is a graph showing a $^{13}$C CP/MAS NMR spectrum of a product of Example 4.

FIG. 13 shows the obtained $^{13}$C CP/MAS NMR spectrum. In this NMR spectrum, signals having peak tops at 29, 116, 123, 149, 160, 174 ppm were observed. Further, for comparison, FIG. 13 shows the $^{13}$C CP/MAS NMR spectrum of the polyacrylonitrile powder, containing no sulfur, treated under the same conditions as above.

Example 5

The reaction product of sulfur powder and polyacrylonitrile powder was obtained in the same manner as in Example 1, except that 0.4 g of vapor grown carbon fiber having a diameter of 150 nm and a length of 10 μm was added to a raw material including 1.0 g of sulfur powder having an average particle size of 50 μm and 0.5 g of polyacrylonitrile having an average particle size of 1 μm.

Subsequently, the product was pulverized into powder, and then the powdered product was put into a glass tube oven and then heated to 250 degree Celsius for 6 hours while the glass tube oven was kept under a vacuum.

Figure 14:
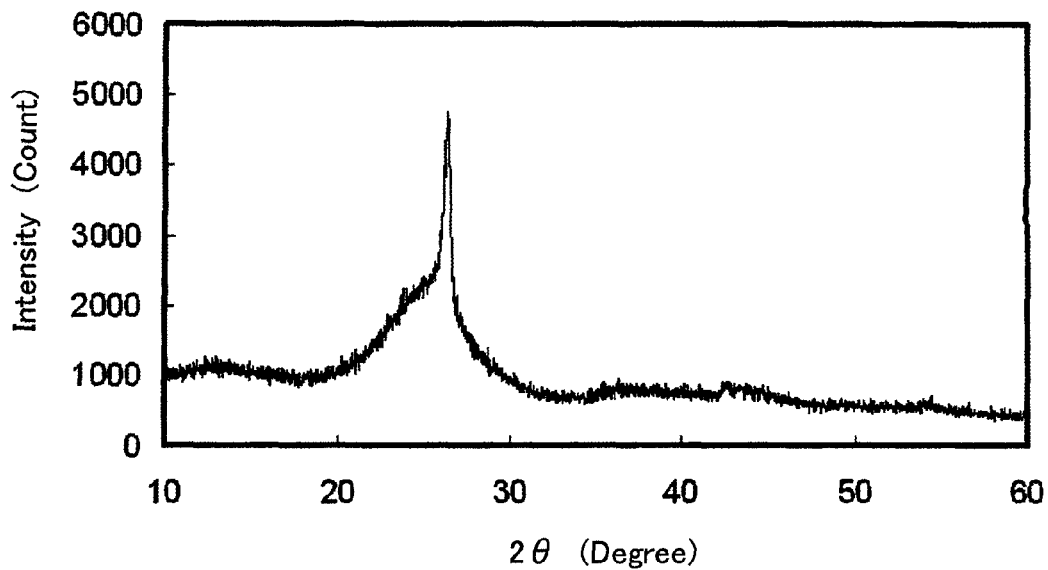
FIG. 14 is a graph showing an X-ray diffraction pattern of a product of Example 5.

FIG. 14 shows the X-ray diffraction pattern of the obtained product. As shown in FIG. 14, the same as in Example 1, a broad diffraction peak was observed at 25° in a diffraction angle (2θ) of 20°~30°. In addition, a peak of carbon, such as graphite having high crystallinity, was observed at 26.4°. Further, considering that the peak based on a sulfur single body was not observed, it was found that sulfur-modified polyacrylonitrile was produced.

Example 6

A lithium secondary battery using each of the products obtained Examples 1, 3 and 5 as a cathode active material was fabricated, and the characteristics thereof were evaluated.

First, 2.7 mg of acetylene black and 0.3 mg of polytetrafluoroethylene (PTFE) were mixed with 3 mg of each of the products obtained in Examples 1, 3 and 5, and then the mixture was kneaded into a film using an agate mortar while adding a suitable amount of ethanol thereto.

The obtained film including a cathode active material was pressed onto a circularly-punched aluminum mesh having a diameter of 14 mm using a press, and was then dried at 140 degree Celsius for 3 hours to obtain a cathode.

An anode was fabricated by punching metal lithium foil having a thickness of 500 μm to a diameter of 14 mm.

A solution in which $LiPF_6$ is dissolved in a mixed solvent of ethylene carbonate and diethyl carbonate of a weight ratio of 1:1 to a concentration of 1.0 mol/L was used as an electrolyte.

A member for a CR2032 type coin battery (manufactured by HOSEN CORPORATION) made of a stainless steel container was used, and the cathode and anode were arranged in a dry room in a state in which a separator (Celgard 2400) having a thickness of 25 μm and made of a polypropylene microporous film and a glass nonwoven fabric filter having a thickness of 500 μm are disposed between them. Subsequently, the container was charged with an electrolyte and then sealed by a sealing machine to fabricate a lithium secondary battery.

Figure 15:
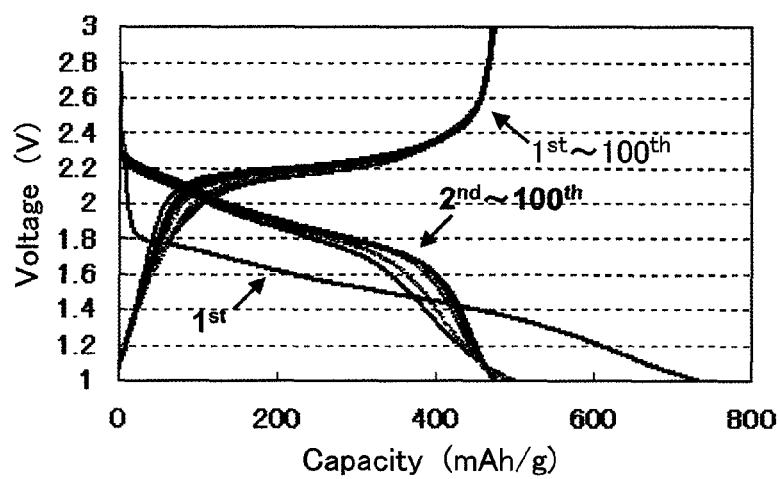
FIG. 15 is a graph showing the results of a charge-discharge test in Example 6 when a product of Example 1 is used as an active material.
Figure 16:
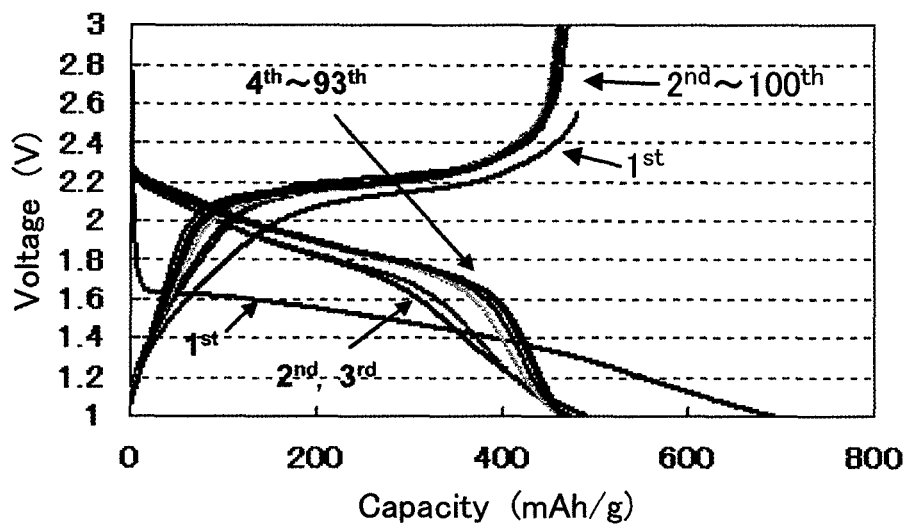
FIG. 16 is a graph showing the results of a charge-discharge test in Example 6 when a product of Example 3 is used as an active material.
Figure 17:
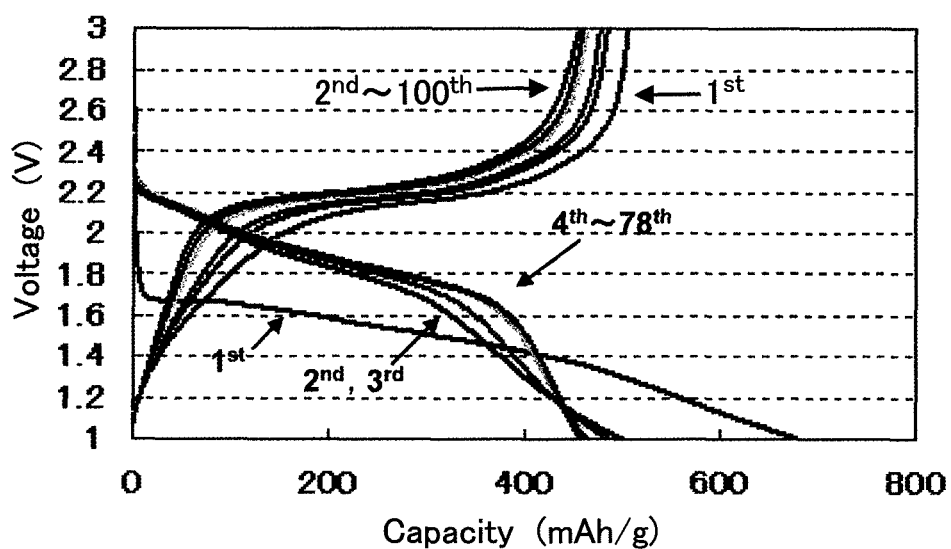
FIG. 17 is a graph showing the results of a charge-discharge test in Example 6 when a product of Example 5 is used as an active material.
Figure 18:
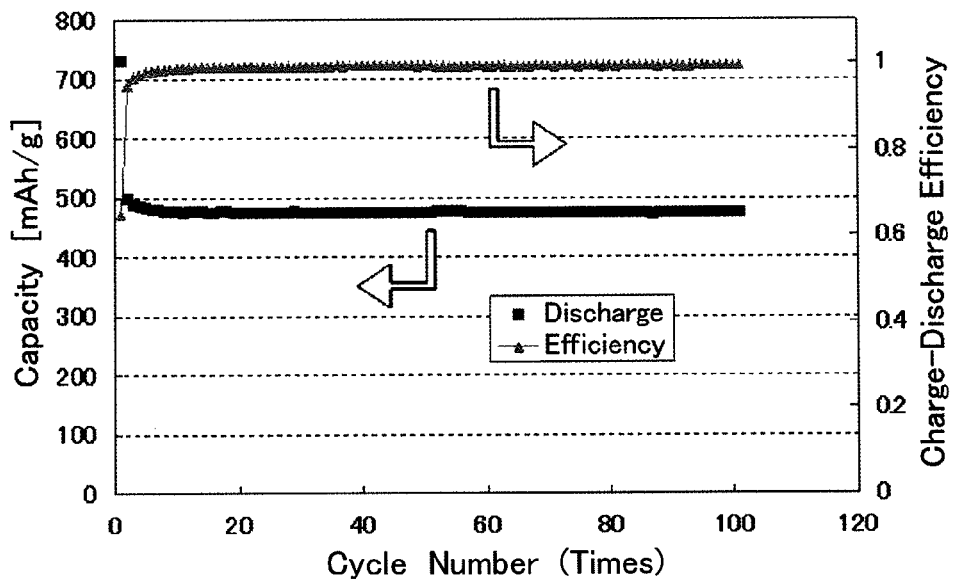
FIG. 18 is a graph showing the results of cycle life characteristics in Example 6 when a product of Example 1 is used as an active material.
Figure 19:
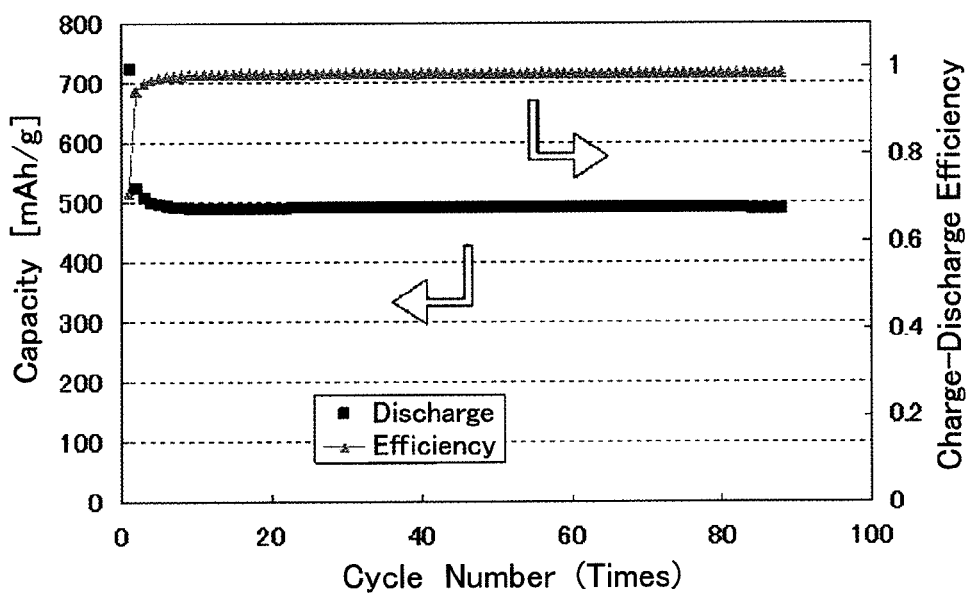
FIG. 19 is a graph showing the results of cycle life characteristics in Example 6 when a product of Example 3 is used as an active material.

The charge-discharge test of the lithium secondary battery was conducted at an electric current of 50 mA per 1 g of a cathode active material. In this case, the final voltage of charge was set to 1.0 V, and the final voltage of discharge was set to 3.0 V. The charge-discharge curves of the lithium secondary battery using the cathode active material of Example 1 are shown in FIG. 15, the charge-discharge curves of the lithium secondary battery using the cathode active material of Example 3 are shown in FIG. 16, and the charge-discharge curves of the lithium secondary battery using the cathode active material of Example 5 are shown in FIG. 17. Further, the cycle life characteristics of the lithium secondary battery using the product obtained in Example 1 as a cathode active material are shown in FIG. 18, and the cycle life characteristics of the lithium secondary battery using the product obtained in Example 3 as a cathode active material are shown in FIG. 19.

As a Comparative Example in which a sulfur single body is used as a cathode active material, a lithium secondary battery was fabricated in the same manner as the above, except that a film containing the cathode active material obtained from a mixture of sulfur, acetylene black and PTFE of a mixing ratio of 6:3:1 by weight was used as a cathode, and a solution in which lithium bistrifluoromethanesulfonylimide (LiTFSI), as a lithium salt, is dissolved in tetraethyleneglycol dimethyl ether (TEGDME), as an ether-based solvent from which sulfur is not easily eluted, to a concentration of 1 mol/L was used as an electrolyte. The charge-discharge test of this lithium secondary battery was conducted under the condition that the final voltage of discharge was set to 1.5 V, and the final voltage of charge was set to 3.0 V. The charge-discharge curve of this lithium secondary battery is shown in FIG. 20.

Figure 20:
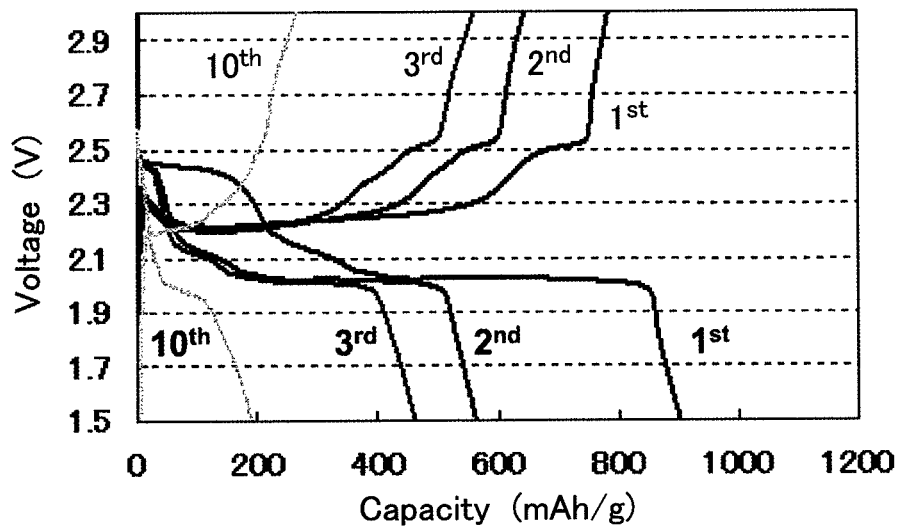
FIG. 20 is a graph showing the results of a charge-discharge test of a battery using a sulfur single body as a cathode.

From the comparison of FIG. 15 with FIG. 20, the following points can be clearly understood. The lithium secondary battery using sulfur as a cathode active material exhibits a capacity of about 900 mAh/g during the first cycle, but the capacity thereof decreases after this. Therefore, the cycle life characteristics of this lithium secondary battery very deteriorate. In contrast, in the lithium secondary battery using the product (sulfur-modified polyacrylonitrile) obtained in the above Example as a cathode active material, the capacity thereof at a charge-discharge cycle slightly decreases. Therefore, it can be seen that the stability of this lithium secondary battery to an electrolyte is excellent.

Example 7

Figure 21:
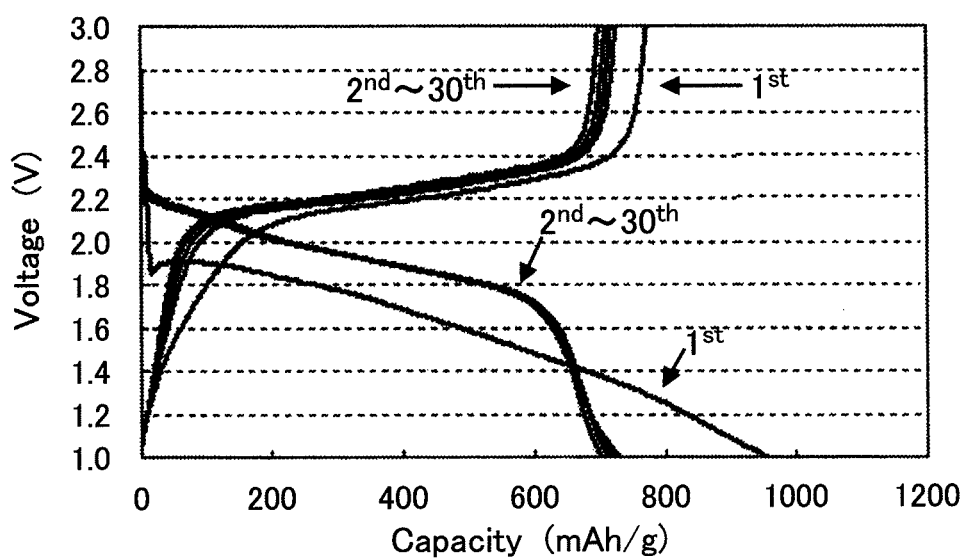
FIG. 21 is a graph showing the results of a charge-discharge test in Example 7.
Figure 22:
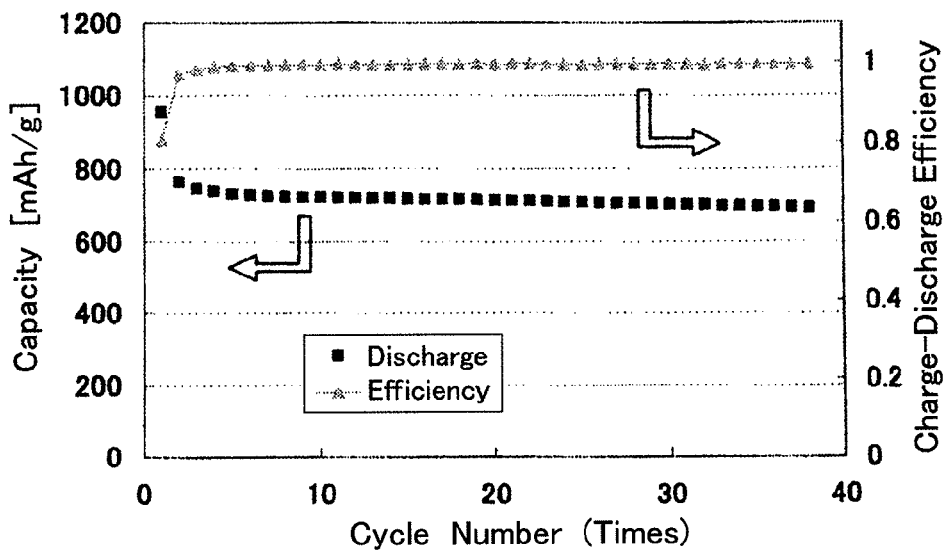
FIG. 22 is a graph showing the results of measuring cycle life characteristics in Example 7.

A coin battery was fabricated using the product obtained in Example 2 as a cathode active material in the same manner as in Example 6, and the characteristics of a battery were evaluated in the same manner as in Example 6. The charge-discharge curve of a lithium secondary battery is shown in FIG. 21, and the cycle life characteristics thereof are shown in FIG. 22. Referring to FIGS. 21 and 22, in the lithium secondary battery of Example 7, the capacity thereof at a charge-discharge cycle slightly decreases. Therefore, it can be seen that the stability of this lithium secondary battery to an electrolyte is excellent. In particular, since this lithium secondary battery exhibits a high discharge capacity of about 760 mAh/g or more during the second cycle, it was found that an electrode material having excellent characteristics was obtained by the method of Example 2.

Example 8

A mixture of 300 parts by weight of sulfur powder and 100 parts by weight of polyacrylonitrile powder was charged in nickel foam, which has a thickness of 1.4 mm and a size of 1 cm×1 cm, by strongly pressing the nickel foam using a spatula, and then the nickel foam charged with the mixture was wrapped with aluminum foil, further wrapped with aluminum laminate film and then fusion-bonded to form a sample where the raw material is enclosed. The sample where raw material is enclosed and 80 mL of water were put into a 200 cc autoclave, and were then heated to 270 degree Celsius for 6 hours after the autoclave was tightly closed.

Figure 23:
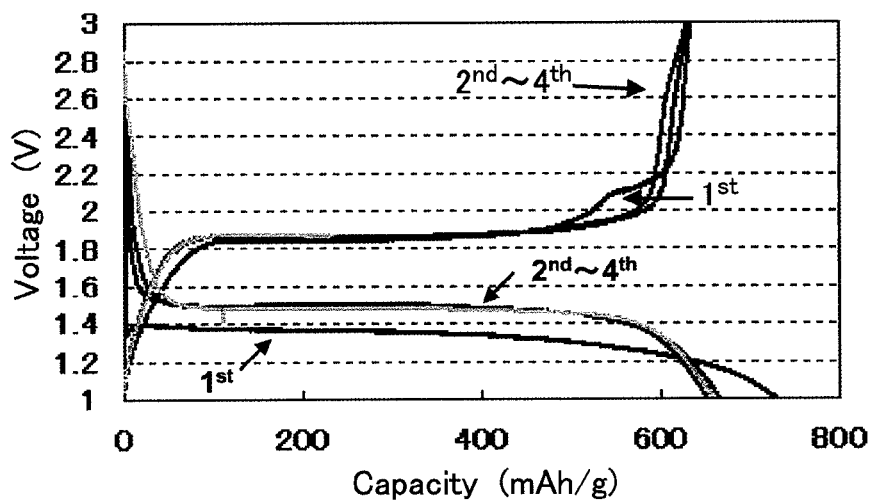
FIG. 23 is a graph showing the results of a charge-discharge test in Example 8.

A lithium secondary battery was fabricated in the same manner as in Example 6, except that an electrode formed by integrating the sulfur-modified polyacrylonitrile and a nickel foam collector obtained in this way with each other was used as a cathode, and the charge-discharge test of this lithium secondary battery was conducted. FIG. 23 shows the charge-discharge curve of this lithium secondary battery. From FIG. 23, it can be seen that this lithium second battery is slightly polarized and has low internal resistance. In this case, it is considered that nickel sulfide produced on the interface between an active material and a collector contributes to the increase in capacity of a battery, whereas the voltage of a battery becomes low under the influence of this nickel sulfide.

Example 9

Polyacrylonitrile powder and sulfur powder were charged in a carbon nonwoven fabric and then heat-treated in an autoclave in the same manner as in Example 8, except that a carbon nonwoven fabric (carbon paper TGP-H-030, manufactured by TORAY INDUSTRIES, INC.), which has a thickness of 120 μm and a size of 1 cm×1 cm, was used as a collector instead of nickel foam.

A lithium secondary battery was fabricated in the same manner as in Example 6, except that an electrode formed by integrating the sulfur-modified polyacrylonitrile and a carbon nonwoven fabric collector obtained in this way with each other was used as a cathode, and the charge-discharge test of this lithium secondary battery was conducted. As a result, the same as the charge-discharge results of the lithium secondary battery of Example 6 fabricated by using the product obtained in Example 3 as a cathode active material and using aluminum mesh as a collector, in the lithium secondary battery obtained by the method of Example 9, the capacity thereof at a charge-discharge cycle slightly decreases. Therefore, according to the method of Example 9, the lithium secondary battery having excellent stability to an electrolyte was obtained. Particularly, in this case, since a binder and an auxiliary conductivity agent may not be used, this lithium secondary battery is advantageous in terms of electrode capacity density.

Example 10

Figure 24:
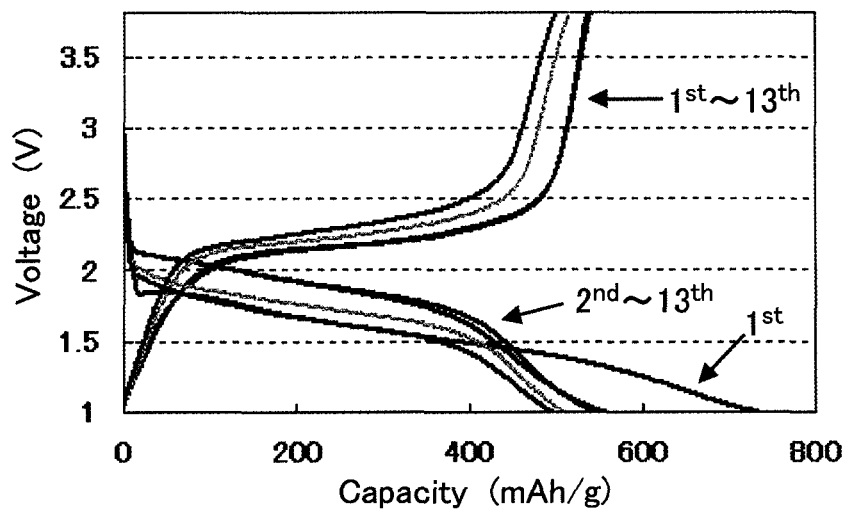
FIG. 24 is a graph showing the results of a charge-discharge test in Example 10.

A lithium secondary battery was fabricated in the same manner as in Example 6, except that a coin battery was fabricated using the product of Example 1 in the same manner as in Example 6, and the final voltage of charge was set to 3.8 V. The characteristics of this lithium secondary battery were evaluated in the same manner as in Example 6, and the results thereof are shown in FIG. 24. From FIG. 24, it can be seen that, even when the lithium secondary battery is repetitively overcharged, the cycle life characteristics of this lithium secondary battery do not deteriorate, and this lithium secondary battery exhibits stable performance.

Example 11

Figure 25:
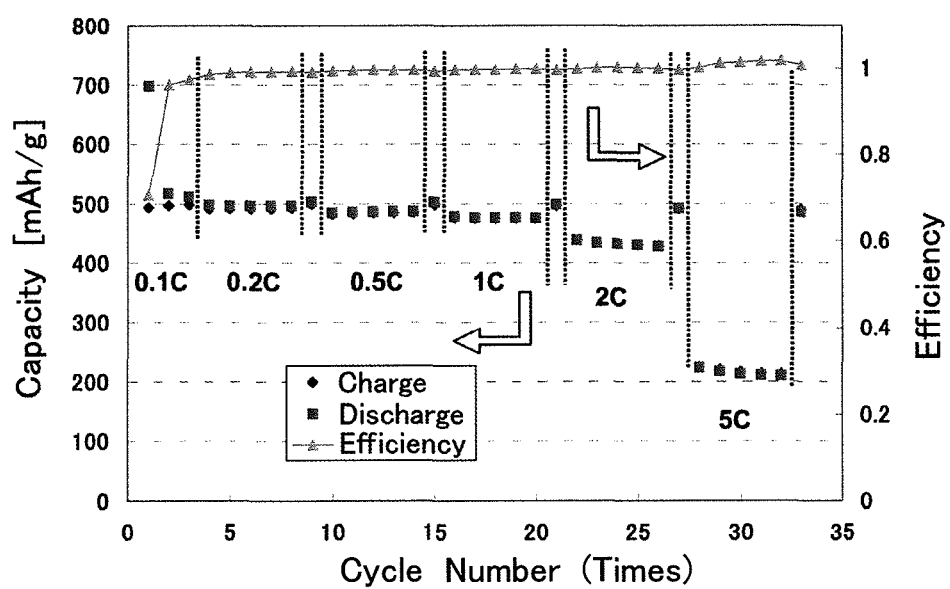
FIG. 25 is a graph showing the results of a charge-discharge test in Example 11.

The characteristics of a lithium secondary battery were evaluated in the same manner as in Example 6, except that output characteristics were evaluated by changing the current value per 1 g of a cathode active material to 0.1 C, 0.2 C, 0.5 C, 1.0 C, 2.0 C, 5.0 C by C rate. The results thereof are shown in FIG. 25. From FIG. 25, it can be seen that output characteristics are very high because the capacity in 2.0 C is about 85% the capacity in 0.1 C.

Example 12

A lithium secondary battery was fabricated using the product obtained in Example 1 as a cathode material by the following method, and the characteristics thereof were evaluated.

First, 40.5 mg of acetylene black and 4.5 mg of polytetrafluoroethylene (PTFE) were mixed with 45 mg of the product obtained in Example 1, and then the mixture was kneaded into a film using an agate mortar while adding a suitable amount of ethanol thereto.

The obtained film including a cathode active material was extended to a size of 25 mm×30 mm, pressed onto an aluminum mesh cut to a size of 30 mm×30 mm using a press, and was then dried at 140 degree Celsius for 3 hours. Then, the portion of the aluminum mesh having a width of 5 mm, on which the cathode active material was not applied, was spot-welded with aluminum foil having a width of 4 mm and a thickness of 120 μm to form a conductive tab.

An anode (called a carbon electrode in the description of pre-doping below) was fabricated by a general method of fabricating a carbon-based anode as follows. First, 85 parts by weight of OMAC2 (manufactured by OSAKA GAS CHEMICALS CO., LTD.), which is an anode material formed by surface-coating spheroidized natural graphite and having a particle diameter of about 20 μm, as an anode active material, 3 parts by weight of Ketjen black (KB) as an auxiliary conductivity agent, 12 parts by weight of polyvinylidene fluoride (PVdF) as a binder, and 200 parts by weight of N-methyl-2-pyrrolidone (NMP) as a solvent were put into a mixing container and then stirred 20 times for 8 minutes to form uniform paste. This paste was uniformly applied onto copper foil having a thickness of 23 μm using a doctor blade, and was then dried in vacuum at 140 degree Celsius for 3 hours to form an electrode layer having a thickness of 80 μm. This electrode layer was cut to a size of 25 mm×30 mm, and was then spot-welded with nickel foil having a width of 4 mm and a thickness of 120 μm as a conductive tab to fabricate an anode.

The active materials, which were used to fabricate the cathode and anode, are lithium-deficient materials, and lithium does not exist in neither of the cathode and anode. Therefore, when these cathode and anode are assembled into a lithium secondary battery, lithium cannot be exchanged between the cathode and the anode, and thus the lithium secondary battery cannot be charged and discharged. Therefore, lithium was previously charged in the anode containing a carbon-based active material using an electrolytic pre-doping technology of lithium. In the electrolytic pre-doping technology of lithium, a metal lithium electrode cut to a size of 25 mm×30 mm and having a thickness of 0.5 mm was used as a counter electrode. Nickel foil having a width of 4 mm and a thickness of 120 μm was used as a conductive tab of the metal lithium electrode, and this nickel foil is pressed to the metal lithium electrode to impart conductivity to the metal lithium electrode. This metal lithium electrode was combined with the carbon-based electrode, and then an aluminum laminate battery for electrolytic pre-doping was fabricated according to the following method. Aluminum laminate film (model number: D-EL40H, manufactured by HOSEN CORPORATION) cut to a size of 6 cm×7 cm was used in the exterior of a battery, the carbon-based electrode and the lithium counter electrode were arranged in a dry room in a state in which a separator (Celgard 2400) made of a polypropylene microporous film having a thickness of 25 μm is disposed between them, and then the laminate of the carbon-based electrode, the separator and the lithium counter electrode were charged with 0.1 cc of the same electrolyte as that of Example 6, and then four sides of the aluminum laminate film were fusion-bonded to fabricate an aluminum laminate battery for electrolytic pre-doping. In this case, the tabs of both electrodes protrude out of an aluminum laminate sack such that the charge-discharge of a battery can be performed by a conductive tab.

Subsequently, the charge-discharge of the aluminum laminate battery for electrolytic pre-doping at 2.5 cycles was conducted by allowing electric current of 15 mA per 1 g of an active material of a carbon-based electrode to flow. Here, the reason why the charge-discharge test thereof was conducted at 2.5 cycles is that the first 2 cycles are set in order to remove and the confirm the effect of the irreversible capacity which occurring at the initial stage of cycle, when a carbon-based active material is used, and the final 0.5 cycles are set in order to charge lithium in the carbon-based electrode. For the purpose of performing only the electrolytic pre-doping, the aluminum laminated battery may be discharged using a lithium metal electrode as a counter electrode, and lithium may be charged into an electrode to be doped.

Figure 26:
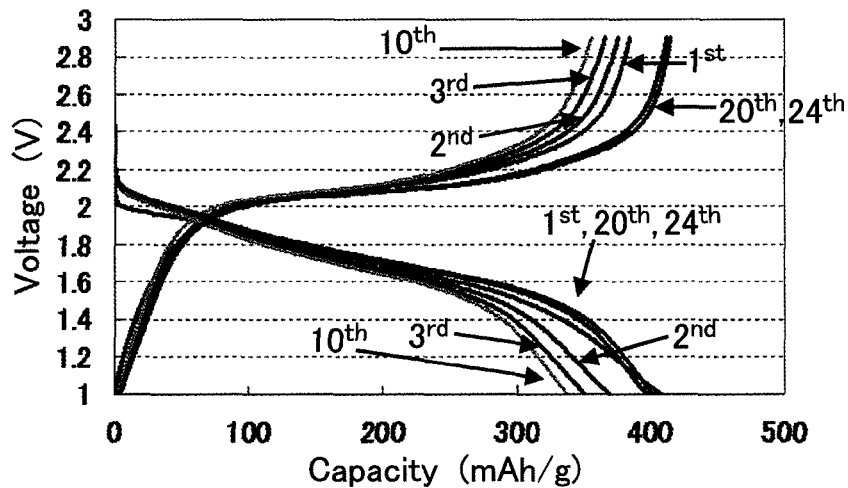
FIG. 26 is a graph showing the results of a charge-discharge test in Example 12.
Figure 27:
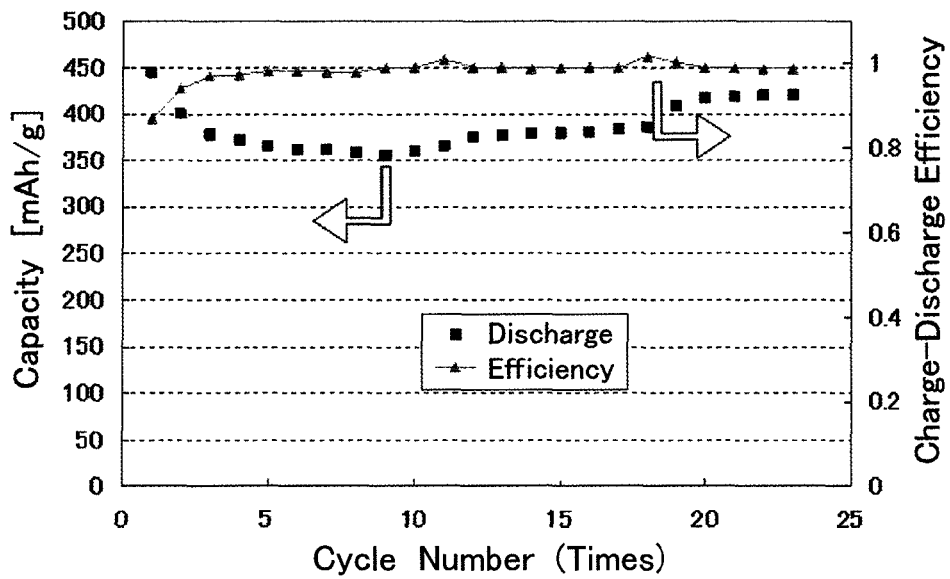
FIG. 27 is a graph showing the results of measuring cycle life characteristics in Example 12.

Subsequently, after 2.5 cycles, the aluminum laminate battery for electrolytic pre-doping was disassembled to obtain a carbon-based electrode pre-doped with lithium. A lithium secondary battery was fabricated in the same manner as was the aluminum laminate battery for electrolytic pre-doping, except that the carbon-based electrode pre-doped with lithium was used as an anode, and the electrode including sulfur-modified polyacrylonitrile was used as a cathode. The charge-discharge of this lithium secondary battery was conducted by allowing electric current of 50 mA per 1 g of a cathode active material to flow. In this case, the final voltage of charge was set to 0.85 V, and the final voltage of discharge was set to 2.9 V. FIG. 26 shows the charge-discharge curve of this lithium secondary battery, and FIG. 27 shows the cycle life characteristics thereof. From FIGS. 26 and 27, it was found that this lithium secondary battery is a high-performance lithium secondary battery having excellent cycle life characteristics because it exhibits high capacity of 410 mAh/g based on the reduction of an active material in the cathode at the 20th charge-discharge cycle.

From the above results, it is obvious that a high-capacity lithium secondary battery can be fabricated when the electrode including sulfur-modified polyacrylonitrile was used as a cathode and the carbon-based electrode pre-doped with lithium was used as an anode.

Example 13

A lithium secondary battery was fabricated by combining the sulfur-modified polyacrylonitrile cathode with the anode of Example 12 in the same manner as in Example 12, except that silicon thin film was used as the anode instead of a carbon-based electrode used in Example 12, and the final voltage of discharge was set to 0.45 V and the final voltage of charge was set to 2.80 V during the charge-discharge test. The characteristics of this lithium secondary battery were evaluated.

Further, the silicon thin film used as the anode of this lithium secondary battery may be formed by forming a silicon layer having a thickness of 5 μm on apiece of copper foil used as a collector by sputtering, cutting the complex of the silicon layer and copper film to create an electrode area of 25 mm×30 mm, welding the complex with a nickel conductive tab and then pre-doping the welded complex of anode with lithium in the same manner as in Example 12.

Figure 28:
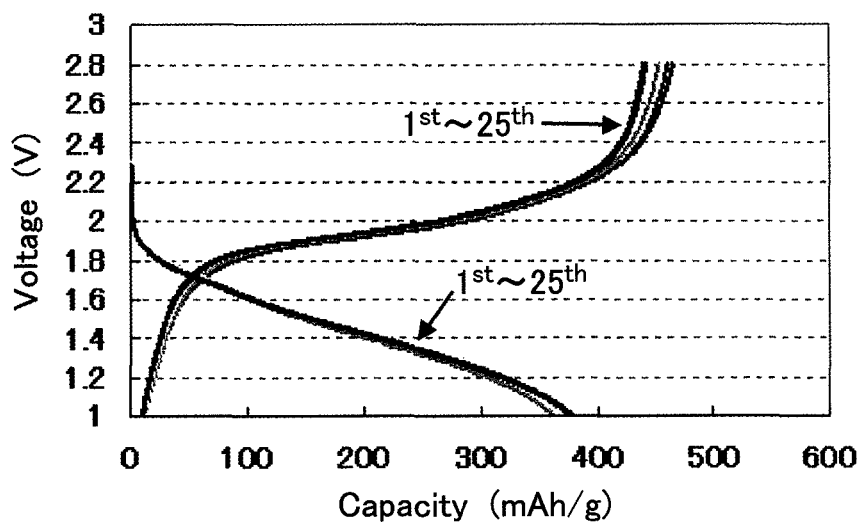
FIG. 28 is a graph showing the results of a charge-discharge test in Example 13.
Figure 29:
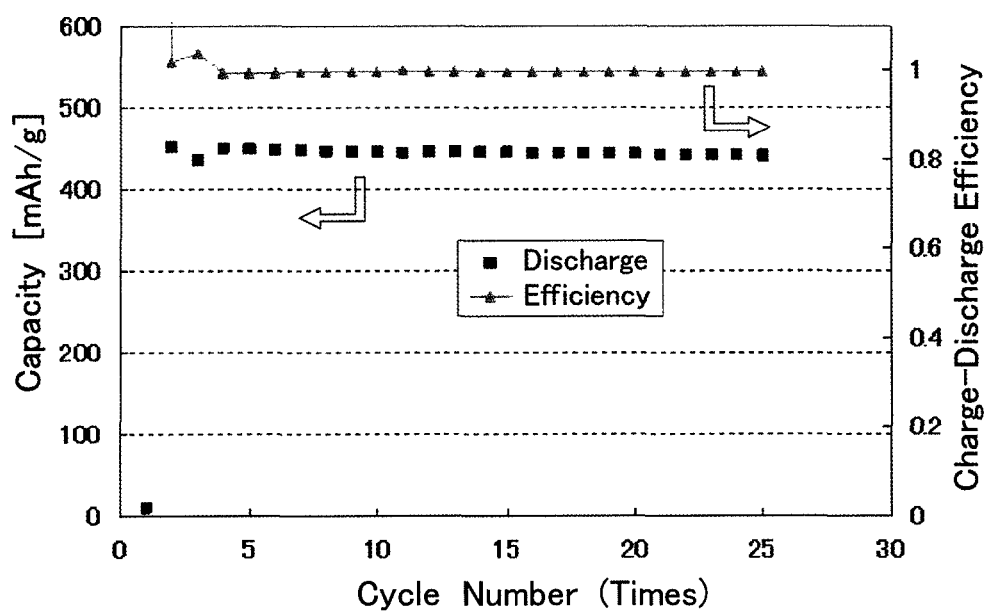
FIG. 29 is a graph showing the results of measuring cycle life characteristics in Example 13.

FIG. 28 shows the charge-discharge curve of this lithium secondary battery, and FIG. 29 shows the cycle life characteristics thereof. From FIGS. 28 and 29, it was found that this lithium secondary battery is a high-performance lithium secondary battery having excellent cycle life characteristics because it exhibits high capacity of 440 mAh/g based on the reduction of an active material in the cathode at the 20th charge-discharge cycle.

Further, when silicon having a theoretical capacity (3500 mAh/g) higher than the theoretical capacity (370 mAh/g) of carbon is used as an anode, the thickness of the anode can be reduced, which is advantageous to fabricate a large-capacity lithium secondary battery in volume.

The invention claimed is:

1. A method of manufacturing sulfur-modified polyacrylonitrile, comprising:
   mixing a base powder comprising sulfur powder and polyacrylonitrile powder;
   heating the base powder to a temperature of from 250 to 500 degree Celsius under a nonoxidative atmosphere while preventing the effluence of sulfur vapor to obtain a crude sulfur-modified polyacrylonitrile;
   cooling the crude sulfur-modified polyacrylonitrile; and
   heating the cooled crude sulfur-modified polyacrylonitrile to a temperature of from 150 to 400 degree Celsius under a nonoxidative atmosphere to obtain a sulfur-modified polyacrylonitrile.

2. The method according to claim 1, wherein the base powder is heated in a closed atmosphere.

3. The method according to claim 1, wherein the base powder is heated while refluxing sulfur vapor in a reaction container having an opening for discharging hydrogen sulfide produced by a reaction.

4. The method according to claim 1, wherein the base powder further includes an auxiliary conductivity agent made of a high crystallinity carbon material.

5. The method according to claim 1, wherein the sulfur-modified polyacrylonitrile has a Raman spectrum having a major peak in the vicinity of 1331 $cm^{-1}$ of Raman shift, and has other peaks in the vicinity of 1548 $cm^{-1}$, 939 $cm^{-1}$, 479 $cm^{-1}$, 381 $cm^{-1}$, 317 $cm^{-1}$ in a Raman shift range of 200 $cm^{-1}$~1800 $cm^{-1}$.

6. A method of manufacturing a cathode for a lithium secondary battery, comprising:
   charging a base powder comprising sulfur powder and polyacrylonitrile powder in a collector made of a porous material; and
   heating the base powder to a temperature of from 250 to 500 degree Celsius under a nonoxidative atmosphere while preventing the effluence of sulfur vapor to obtain a crude sulfur-modified-modified polyacrylonitrile;
   cooling the crude sulfur-modified polyacrylonitrile; and
   heating the cooled crude sulfur-modified polyacrylonitrile to a temperature of from 150 to 400 degree Celsius under a nonoxidative atmosphere to obtain a cathode comprising sulfur-modified polyacrylonitrile.

7. The method according to claim 6, wherein the collector made of a porous material is a nonwoven or woven fabric made of a carbon material having high degree of graphitization.

8. The method according to claim 6, wherein the base powder further includes an auxiliary conductivity agent made of a high-crystallinity carbon material.

9. The method according to claim 1, wherein the sulfur-modified polyacrylonitrile is cooled to room temperature.

* * * * *